United States Patent
Kim

(10) Patent No.: US 9,621,498 B2
(45) Date of Patent: Apr. 11, 2017

(54) MOBILE TERMINAL AND CONTROLLING METHOD THEREOF

(71) Applicant: LG ELECTRONICS INC., Seoul (KR)

(72) Inventor: Kyuseok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 190 days.

(21) Appl. No.: 13/757,611

(22) Filed: Feb. 1, 2013

(65) Prior Publication Data

US 2013/0201211 A1 Aug. 8, 2013

(30) Foreign Application Priority Data

Feb. 2, 2012 (KR) .................. 10-2012-0010738

(51) Int. Cl.
G06K 7/10 (2006.01)
H04L 12/58 (2006.01)
G06T 11/60 (2006.01)

(52) U.S. Cl.
CPC .............. H04L 51/10 (2013.01); G06T 11/60 (2013.01)

(58) Field of Classification Search
None
See application file for complete search history.

(56) References Cited

U.S. PATENT DOCUMENTS

| 6,637,662 B2 * | 10/2003 | Itou et al. ................. 235/472.01 |
| 2002/0063889 A1 * | 5/2002 | Takemoto et al. ........... 358/1.15 |
| 2005/0286463 A1 * | 12/2005 | Matsumoto ................... 370/328 |
| 2006/0055804 A1 * | 3/2006 | Arai et al. ................ 348/333.01 |
| 2007/0036346 A1 * | 2/2007 | Kwon ................... G06F 3/0482 379/413 |
| 2007/0174108 A1 * | 7/2007 | Monster ................ G06F 9/4448 705/7.32 |
| 2012/0074215 A1 * | 3/2012 | Yoo .............................. 235/375 |

* cited by examiner

*Primary Examiner* — Michael G Lee
*Assistant Examiner* — Tabitha Chedekel
(74) *Attorney, Agent, or Firm* — Lee, Hong, Degerman, Kang & Waimey PC

(57) ABSTRACT

A mobile terminal and controlling method thereof are disclosed, by which side information is facilitated to be inserted or modified in a multimedia content using an optically readable code. The present invention includes the steps of acquiring an image, acquiring side information on the acquired image, converting the acquired side information to an optically readable digital code, and saving the digital code and the image in a manner of linking the digital code and the image to each other.

20 Claims, 17 Drawing Sheets

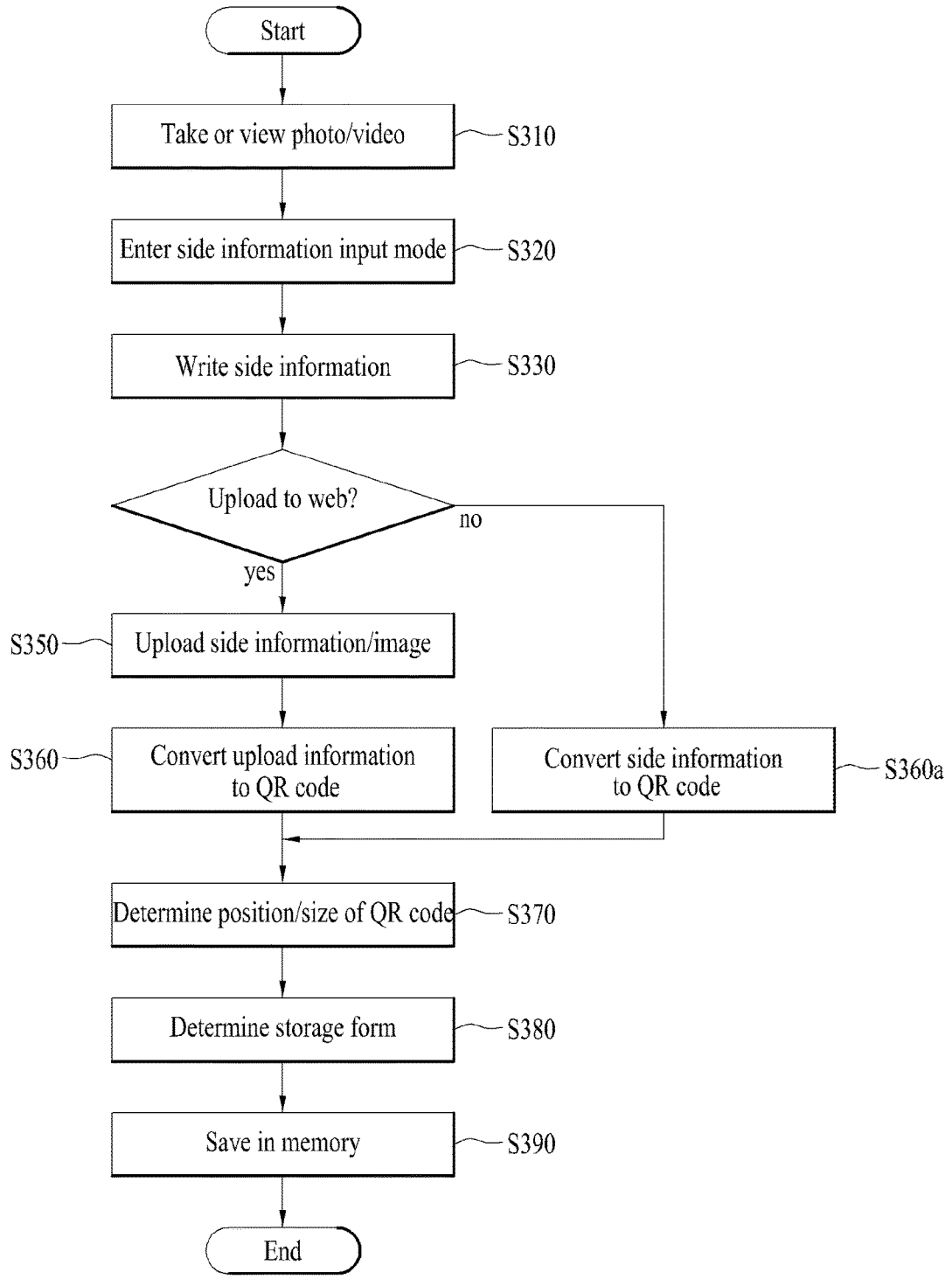

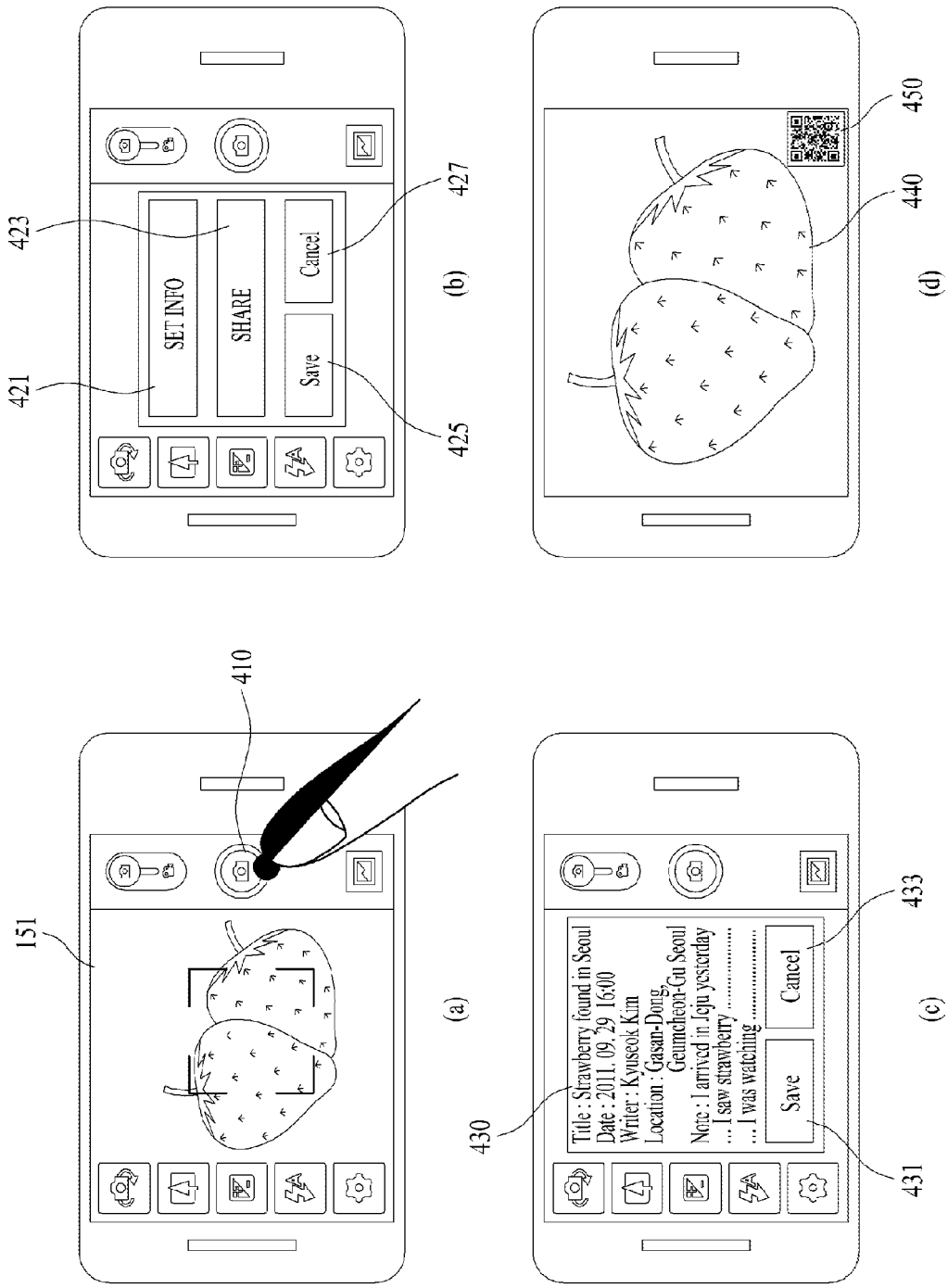

FIG. 5
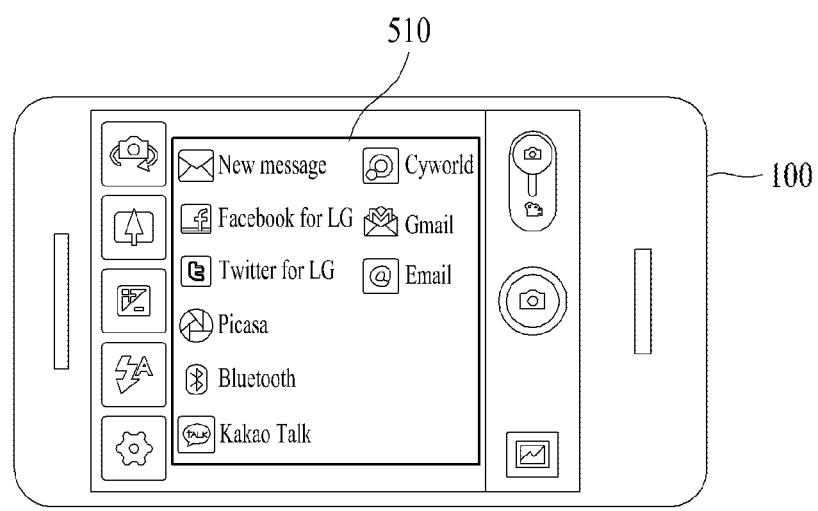
(a)
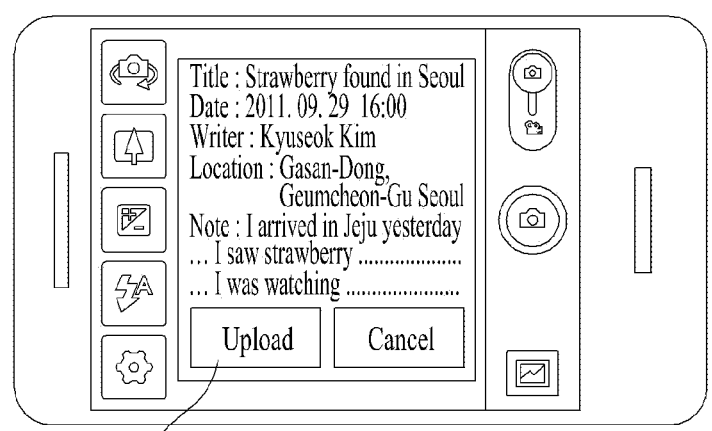
(b)

FIG. 6
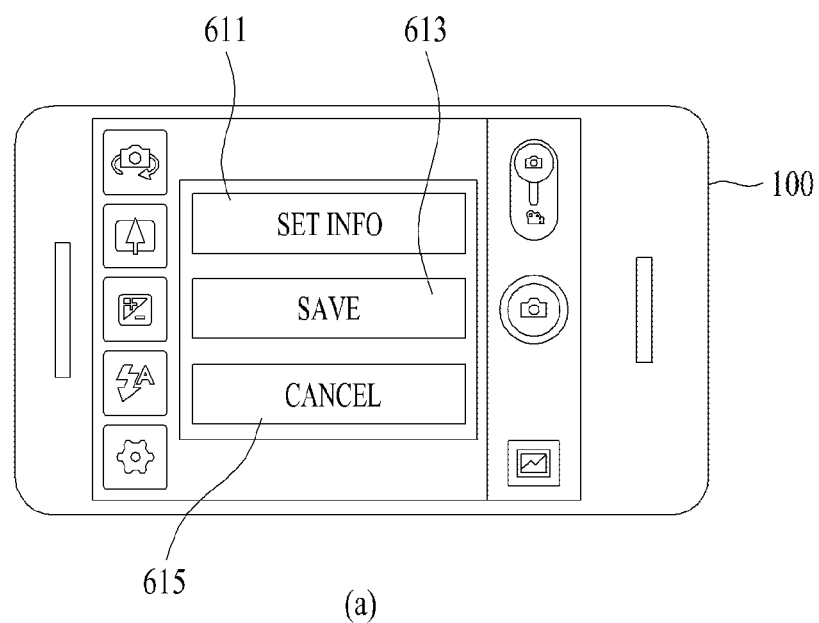
(a)
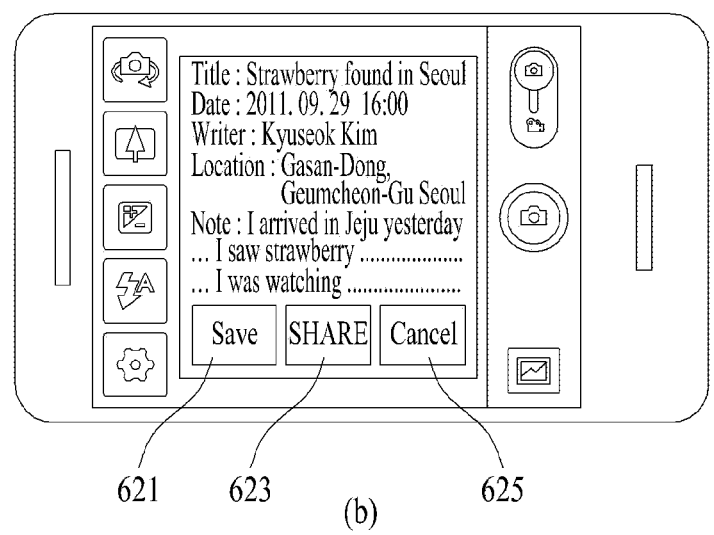
(b)

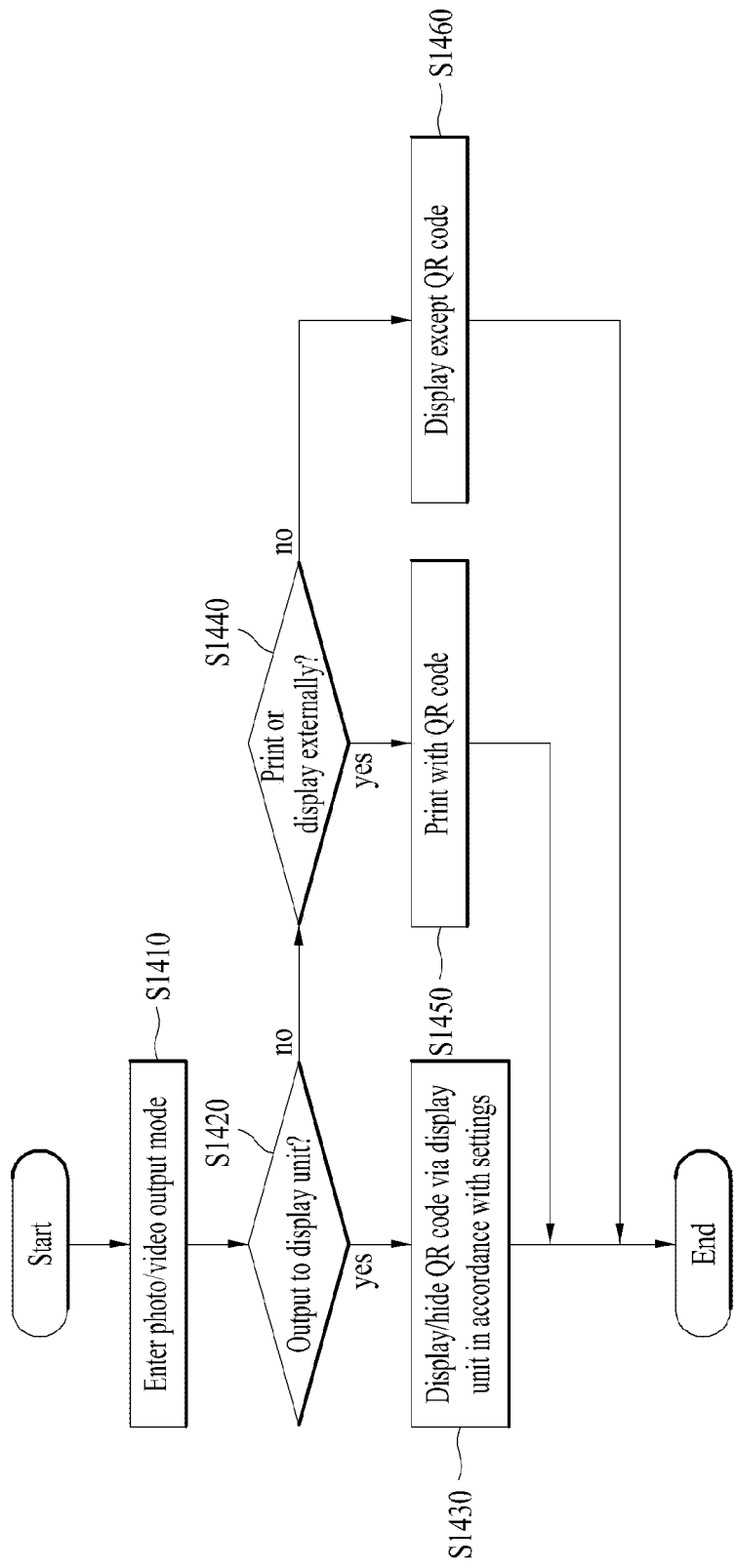

MOBILE TERMINAL AND CONTROLLING METHOD THEREOF

Pursuant to 35 U.S.C. §119(a), this application claims the benefit of earlier filing date and right of priority to Korean Application No. 10-2012-0010738, filed on Feb. 2, 2012, the contents of which are hereby incorporated by reference herein in their entirety.

BACKGROUND OF THE INVENTION

Field of the Invention

The present invention relates to a mobile terminal, and more particularly, to a mobile terminal and controlling method thereof. Although the present invention is suitable for a wide scope of applications, it is particularly suitable for facilitating side information to be inserted or modified in a multimedia content using an optically readable code.

Discussion of the Related Art

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and the like for example.

To support and increase of the terminal functions, it may be able to consider the improvement of structural parts and/or software parts of the terminal.

Recently, the demand for appreciating multimedia contents via a mobile terminal keeps increasing. In this situation, the demand for a method of inserting side information in a multimedia content or editing the inserted side information mode conveniently is rising.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and user interface for controlling the same, by which side information can be inserted or modified in a multimedia content more conveniently.

Another object of the present invention is to provide a mobile terminal and controlling method thereof, by which an optically readable digital code can be used in inserting side information in a content.

Technical tasks obtainable from the present invention are non-limited the above-mentioned technical task. And, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a memory and a controller, if acquiring an image and side information on the image, converting the acquired side information to an optically readable digital code, the controller saving the digital code and the image in a manner of linking the digital code and the image to each other.

In another aspect of the present invention, a method of controlling a mobile terminal according to the present invention includes the steps of acquiring an image, acquiring side information on the acquired image, converting the acquired side information to an optically readable digital code, and saving the digital code and the image in a manner of linking the digital code and the image to each other.

Accordingly, the present invention provides the following effects and/or advantages.

First of all, a user is able to insert side information in a multimedia content or edit the side information mode conveniently.

Secondly, a user creates various kinds of optically readable digital codes including desired side information and is able to arrange the created digital codes in multimedia contents.

Thirdly, a user is facilitated to upload a multimedia content and/or side information to an external device and insert the upload information in the multimedia content in a manner that the upload information is contained in various kinds of optically readable digital codes.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 is a flowchart of a process for inserting an optically readable digital code in a multimedia content in a mobile terminal according to one embodiment of the present invention;

FIG. 4A is a diagram for one example of a process for inserting side information in a photo taken via a mobile terminal according to one embodiment of the present invention;

FIG. 5 is a diagram for a process for inserting share information in case that a photo taken via a mobile terminal according to one embodiment of the present invention is shared externally;

FIG. 6 is a diagram for another example of a process for inserting side information in a photo taken via a mobile terminal according to one embodiment of the present invention;

FIG. 14 is a flowchart for another example of a process for displaying a QR code inserted content in a mobile terminal according to one embodiment of the present invention.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are often used for elements in order to facilitate discussion of the disclosure. Therefore, significant meanings or roles are not given to the suffixes themselves and it is understood that the 'module', 'unit' and 'part' can be used together or interchangeably.

In the following detailed description, it is assumed that an image display device is a terminal. Various types of terminals may be implemented using the various techniques discussed herein. Examples of such terminals include mobile as well as stationary terminals, such as mobile phones, user equipment, smart phones, DTV, computers, digital broadcast terminals, personal digital assistants, portable multimedia players (PMPs), navigators, and the like. By way of non-limiting example only, further description will be with regard to a mobile terminal 100, and such teachings may apply equally to other types of terminals.

Figure 1:
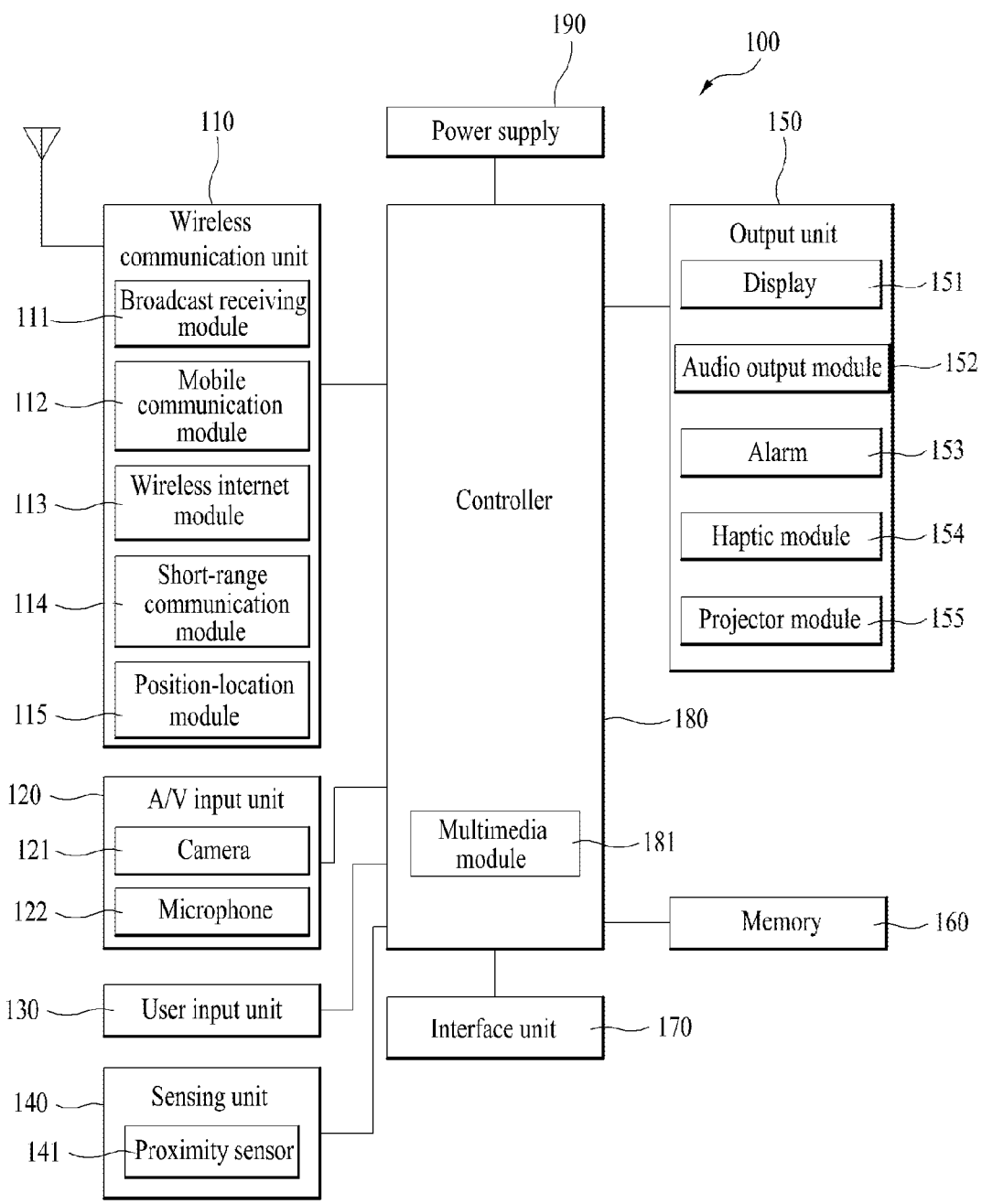
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 having a wireless communication unit 110, an A/V (audio/video) input unit 120, a user input unit 130, a sensing unit 140, an output unit 150, a memory 160, an interface unit 170, a controller 180, a power supply unit 190, among other components. Mobile terminal 100 is shown having various components, but it is understood that implementing all of the illustrated components is not a requirement as greater or fewer components may alternatively be implemented.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115, and the like.

The broadcast receiving module 111 receives a broadcast signal and/or broadcast associated information from an external broadcast managing server via a broadcast channel. The broadcast channel may include a satellite channel and a terrestrial channel. The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. This broadcast associated information can also be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By non-limiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured to be suitable for other broadcasting systems as well as the above-identified digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceiving, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), LTE (Long Term Evolution) and the like.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring still to FIG. 1, the audio/video (A/V) input unit 120 is shown configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. Typically, the processed image frames can be displayed on the display 151.

The image frames processed by the camera 121 can be stored in the memory 160 or can be externally transmitted via the wireless communication unit 110. Optionally, two or more cameras 121 can be provided to the mobile terminal 100 according to the environment in which the terminal used to according to user needs.

The microphone 122 receives an external audio signal while the portable device is in a particular mode, such as phone call mode, recording mode and voice recognition mode. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, and the like.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. If desired, the sensing unit 140 can include a proximity sensor 141.

The output unit 150 generates outputs relevant to the senses of sight, hearing, touch and the like. In some cases, the output unit 150 includes the display 151, an audio output module 152, an alarm unit 153, a haptic module 154, a projector module 155, and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmissive type, which can be named a transparent display. As a representative example for the transparent display, there is TOLED (transparent OLED) or the like. A rear configuration of the display 151 can be implemented in the optical transmissive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In the case where the display 151 and a sensor for detecting a touch action (hereinafter also referred to a 'touch sensor') configures a mutual layer structure (hereinafter also referred to a 'touchscreen'), the user can use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

With continued reference to FIG. 1, a proximity sensor (not shown in the drawing) can be provided to an internal area of the mobile terminal 100 enclosed by the touchscreen or proximate to the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one or more of a transmissive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor, and the like. When the touchscreen includes the electrostatic capacity proximity sensor, it may also be configured to detect the proximity of a pointer using a variation of electric field according to the proximity of the pointer. In this scenario, the touchscreen (touch sensor) can be classified as a proximity sensor.

In the following description, for clarity, an action that a pointer approaches without contacting with the touchscreen to be recognized as located on the touchscreen is referred to as 'proximity touch' while an action that a pointer actually touches the touchscreen may be referred to as a 'contact touch'. The meaning of the position on the touchscreen proximity-touched by the pointer refers to the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing element (not shown in the drawing) for producing an image to output externally using the light generated from the light source, and a lens (not shown in the drawing) for enlarging the image for output externally at predetermined focus distance. The projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. It is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on the Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identity Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component. Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such feature may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
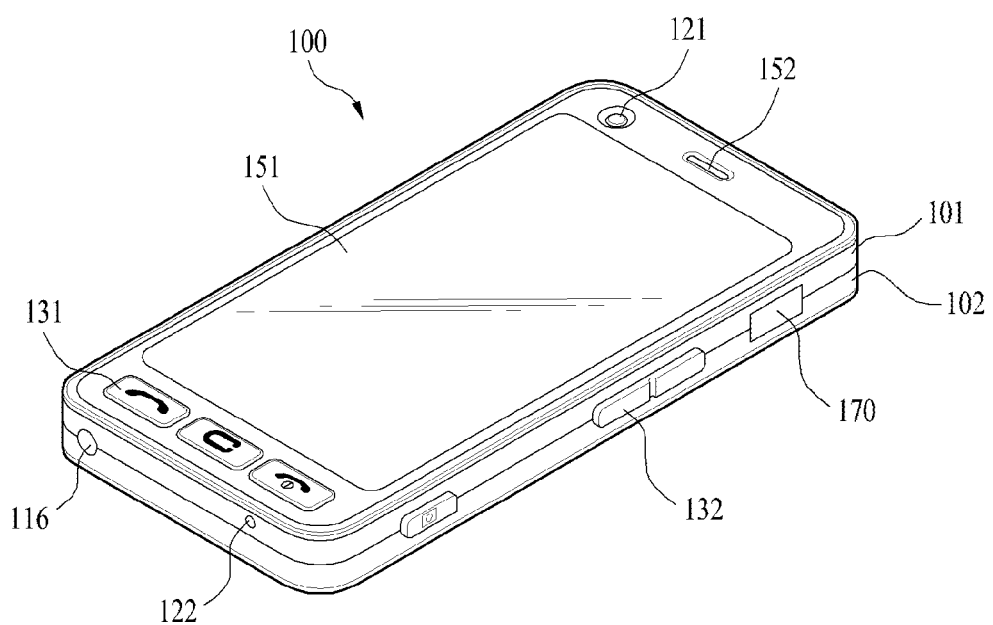
FIG. 2A is a front perspective diagram of a mobile terminal according to one embodiment of the present invention.

FIG. 2A is a front perspective diagram of a mobile terminal according to various embodiments of the present invention. The mobile terminal 100 is shown as a bar type terminal body, but the mobile terminal may alternative be implemented using other configuration such as folder-type, slide-type, rotational-type, swing-type, combinations thereof, and the like. For clarity, further disclosure will primarily relate to a bar-type mobile terminal 100, but such teachings apply equally to other types of mobile terminals.

Referring still to FIG. 2A, the mobile terminal 100 includes a case (casing, housing, cover, etc.) configuring an exterior thereof. The case is shown divided into a front case 101 and a rear case 102. Various electric/electronic parts are positioned or otherwise located in a space or cavity provided between the front and rear cases 101 and 102. Optionally, at least one middle case can be further provided between the front and rear cases 101 and 102. The cases 101 and 102 may be formed by injection molding of synthetic resin or they can be formed of metal substance such as stainless steel (STS), titanium (Ti) or the like, for example.

A display 151, an audio output unit 152, a camera 121, user input units 130/131 and 132, a microphone 122, an interface 180 and the like can be provided to the terminal body, and more particularly, to the front case 101.

The display 151 is shown occupying the majority of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. The input unit 130 may also include a plurality of manipulating units 131 and 132. The manipulating units 131 and 132 will sometimes be referred to herein as a manipulating portion and they may implement any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. A command for volume adjustment of sound outputted from the audio output unit 152, a command for switching to a touch recognizing mode of the display 151 or the like can be inputted to the second manipulating unit 132.

Interconnected operational mechanism between the display 151 and the touchpad 135 are explained with reference to FIG. 2B as follows.

Figure 2B:
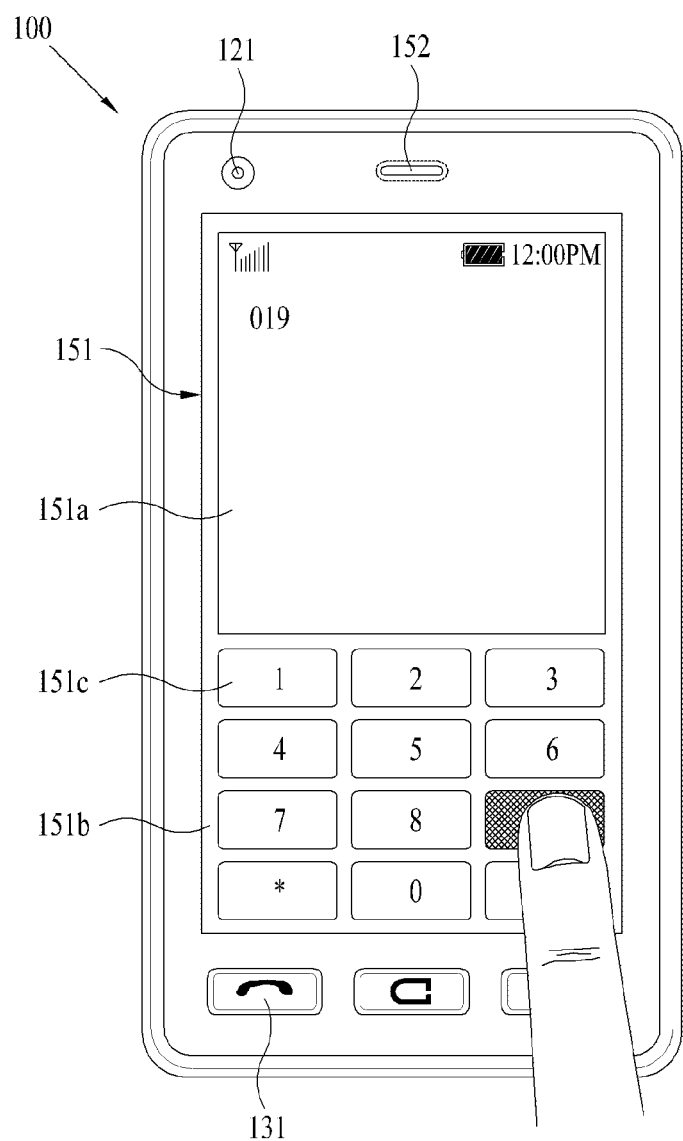
FIG. 2B is a front diagram of a mobile terminal according to one embodiment of the present invention to describe one operational status thereof.

FIG. 2B is a front-view of terminal 100 according to various embodiment of the present invention. First of all, various kinds of visual information can be displayed on the display 151. Such information can be displayed in characters, numerals, symbols, graphics, icons and the like. In order to input the information, at least one of the characters, numerals, symbols, graphics and icons are represented as a single predetermined array to be implemented in a keypad formation. This keypad formation is also referred to as 'soft keys'.

FIG. 2B shows that a touch applied to a soft key is inputted through a front face of a terminal body. The display 151 is operable through an entire area or by being divided into a plurality of regions. In the latter case, a plurality of the regions can be configured interoperable. For instance, an output window 151a and an input window 151b are displayed on the display 151. A soft key 151c representing a digit for inputting a phone number or the like is outputted to the input window 151b. If the soft key 151c is touched, a digit corresponding to the touched soft key is outputted to the output window 151a. If the first manipulating unit 131 is manipulated, a call connection for the phone number displayed on the output window 151a is attempted.

In addition, the display 151 or the touchpad 135 can be configured to receive a touch input by scroll. A user scrolls the display 151 or the touchpad 135 to shift a cursor or pointer located at an entity (e.g., icon or the like) displayed on the display 151. Furthermore, in case that a finger is shifted on the display 151 or the touchpad 135, a path of the shifted finger can be visually displayed on the display 151. This may be useful in editing an image displayed on the display 151.

Consider the scenario in which both the display (touch screen) 151 and the touchpad 135 are touched together within a predetermined or threshold time range, thus causing one function of the terminal can be executed. This simultaneous touch example may correspond to a case that the terminal body is held by a user using a thumb and a first finger (clamping). The above function can include activation or deactivation for the display 151 or the touchpad 135.

Meanwhile, such a graphic for pointing at a specific object on a display unit or selecting a menu from the display unit as an arrow, a finger and the like is called a pointer or a cursor. Yet, the pointer is frequently used to mean a finger, a stylus pen or the like for a touch manipulation and the like. In order to clearly discriminate the pointer and the cursor from each other in this disclosure, a graphic displayed on a display unit is named a cursor and such a physical means for performing a touch, a proximity touch, a gesture and the like as a finger, a stylus pen and the like is named a pointer.

For clarity and convenience of the following description, a mobile terminal mentioned in the following description is assumed as including at least one of the components shown in FIG. 1.

Inserting Side Information in Multimedia Content Using Optically Readable Code

According to one embodiment of the present invention, it is proposed to conveniently insert or edit side information in a multimedia content using an optically readable digital code.

So to speak, a mobile terminal according to an embodiment of the present invention creates a code containing various kinds of side informations and is then able to have the created code inserted in or overlaid on a multimedia file. To help the understanding, for example, when a user intends to add text information to a photo file, if an addition-desired text is inputted to a mobile terminal, the mobile terminal creates a code containing the corresponding text and then overlays the created code on a photo, thereby saving the related text. Thus, considering the property of a code, a multimedia content preferably contains image information like a still image or a video.

Meanwhile, an optically readable digital code may conceptionally include such a 1-dimensional (1D) code as a general bar code or such a 2-dimensional (2D) code as a QR (quick response) code. In the following description, the 1D and 2D codes applicable to the present invention are schematically explained.

First of all, the 1D code may be recognized as having the same meaning of a bar code. Owing to recognition speed and accuracy, easy manipulation and the like, the 1D code has been widely popularized. As the convenience of the popularized bar code is widely known, various demands for 'code capable of containing more informations', 'code capable of representing more character types', 'printable in smaller space' and the like have risen in the market. In order to raise an information size, options of increasing the digits of the bar code, enumerating several bar codes and the like have been proposed. Yet, these options cause a problem of increasing a display area, a problem of requiring a complicated comprehension job, a problem of raising a print cost and the like. In order to cope with the demands and problems, 2D codes are introduced. The QR code enables a recordable information size by leaps and bounds in a manner of having information recorded in two directions (e.g., width and length directions), whereas the bar code has information recorded in one direction only. The 2D code is being evolved into a matrix form that increases information density greater than that of a stack barcode form in which barcodes are stacked/overlapped.

Table 1 shows names and features of 4 kinds of representative 2D codes.

TABLE 1

| Type | QR code | PDF417 | Data Matrix | Maxi Code |
|---|---|---|---|---|
| Developer (country) | DENSO WAVE (Japan) | Symbol (USA) | CI Matrix (UK) | UPS (USA) |
| Form | Matrix | Stack barcode | Matrix | Matrix |
| Numeral capacity | 7,089 | 2,710 | 3,116 | 138 |
| English character capacity | 4,296 | 1,850 | 2,355 | 93 |
| Binary Capacity | 2,953 | 1,018 | 1,556 | |
| Chinese character capacity | 1,817 | 554 | 778 | |

TABLE 1-continued

| Type | QR code | PDF417 | Data Matrix | Maxi Code |
|---|---|---|---|---|
| Major feature | Large capacity/small-space fast recognition | Large capacity | Small space | Fast comprehension |
| Major usage | All fields | Office automation (OA) | Factory automation (FA) | Logistics |
| Standardization | AIM International JIS/ISO | AIM International ISO | AIM International ISO | AIM International ISO |

Referring to Table 1, it can be observed that QR code has relatively good property among various kinds of 2D codes. Table 2 in the following shows QR code options.

TABLE 2

| | |
|---|---|
| Code size | 21 × 21 cells~177 × 177 cells (increase by 4 cells/side) |
| Information type & information size (mixable) | Numeral Max. 7,089 characters |
| | Zero numerals Max. 4,296 characters |
| | 8 bit byte (binary) Max. 2,953 characters |
| | English letter Max. 1,817 characters |
| Error reconstructive capability | Level L Codewords: about 7% reconstructable |

TABLE 2-continued

| | | |
|---|---|---|
| (data reconstruction function) | Level M | Codewords: about 15% reconstructable |
| | Level Q | Codewords: about 25% reconstructable |
| | Level H | Codewords: about 30% reconstructable |
| Code connecting function | | Max. 16 partitions (print in narrow and long space) |

Versions of QR code include 1~40 and a cell configuration (i.e., number of cells) is determined for each of the versions. In this case, the cell means quadrangular black/white dots that configure the QR code.

The 'cell configuration' indicates the number of cells within the code. In particular, Version 1 starts with 21×21 cells. And, the following versions increase by 4 cells per width and length. Finally, the cell configuration of Version 40 is set to 177×177 cells.

In the version of the QR code, the maximum input character number of data size/character type is set to correspond to an error reconstructive level.

The maximum input number according to each version is shown in Table 3.

TABLE 3

| Version | No. of cells | Error reconstructive level | No. of data bits | Numerals | Zero numerals | Binary | Chinese characters |
|---|---|---|---|---|---|---|---|
| 31 | 141 × 141 | L | 14,744 | 4,417 | 2,677 | 1,840 | 1132 |
| | | M | 11,640 | 3,486 | 2,113 | 1,452 | 894 |
| | | Q | 8,264 | 2,473 | 1,499 | 1,030 | 634 |
| | | H | 6,344 | 1,897 | 1,150 | 790 | 486 |
| 32 | 145 × 145 | L | 15,640 | 4,686 | 2,840 | 1,952 | 1,201 |
| | | M | 12,328 | 3,693 | 2,238 | 1,538 | 947 |
| | | Q | 8,920 | 2,670 | 1,618 | 1,112 | 684 |
| | | H | 6,760 | 2,022 | 1,226 | 842 | 518 |
| 33 | 149 × 149 | L | 16,568 | 4,965 | 3,009 | 2,068 | 1,273 |
| | | M | 13,048 | 3,909 | 2,369 | 1,628 | 1,002 |
| | | Q | 9,368 | 2,805 | 1,700 | 1,168 | 719 |
| | | H | 7,208 | 2,157 | 1,307 | 898 | 553 |
| 34 | 153 × 153 | L | 17,528 | 5,253 | 3,183 | 2,188 | 1,347 |
| | | M | 13,800 | 4,134 | 2,506 | 1,722 | 1,060 |
| | | Q | 9,848 | 2,949 | 1,787 | 1,228 | 756 |
| | | H | 7,688 | 2,301 | 1,394 | 958 | 590 |
| 35 | 157 × 157 | L | 18,448 | 5,529 | 3,351 | 2,303 | 1,417 |
| | | M | 14,496 | 4,343 | 2,632 | 1,809 | 1,113 |
| | | Q | 10,288 | 3,081 | 1,867 | 1,283 | 790 |
| | | H | 7,888 | 2,361 | 1,431 | 983 | 605 |
| 36 | 161 × 161 | L | 19,472 | 5,836 | 3,537 | 2,431 | 1,496 |
| | | M | 15,312 | 4,588 | 2,780 | 1,911 | 1,176 |
| | | Q | 10,832 | 3,244 | 1,966 | 1,351 | 832 |
| | | H | 8,432 | 2,524 | 1,530 | 1,051 | 647 |
| 37 | 165 × 165 | L | 20,528 | 6,153 | 3,729 | 2,563 | 1,577 |
| | | M | 15,936 | 4,775 | 2,894 | 1,989 | 1,224 |
| | | Q | 11,408 | 3,417 | 2,071 | 1,423 | 876 |
| | | H | 8,768 | 2,625 | 1,591 | 1,093 | 673 |
| 38 | 169 × 169 | L | 21,616 | 6,479 | 3,927 | 2,699 | 1,661 |
| | | M | 16,816 | 5,039 | 3,054 | 2,099 | 1,292 |
| | | Q | 12,016 | 3,599 | 2,181 | 1,499 | 923 |
| | | H | 9,136 | 2,735 | 1,658 | 1,139 | 701 |
| 39 | 173 × 173 | L | 22,496 | 6,743 | 4,087 | 2,809 | 1,729 |
| | | M | 17,728 | 5,313 | 3,220 | 2,213 | 1,362 |
| | | Q | 12,656 | 3,791 | 2,298 | 1,579 | 972 |
| | | H | 9,776 | 2,927 | 1,774 | 1,219 | 750 |
| 40 | 177 × 177 | L | 23,648 | 7,089 | 4,296 | 2,953 | 1,817 |
| | | M | 18,672 | 5,596 | 3,391 | 2,331 | 1,435 |
| | | Q | 13,328 | 3,993 | 2,420 | 1,663 | 1,024 |
| | | H | 10,208 | 3,057 | 1,852 | 1,273 | 784 |

Referring to Table 3, it can be observed that more cells for configuring QR code are necessary to correspond to an increasing data size. And, it can be also observed that the QR code increases correspondingly.

In the following description, for clarity, assume that an optically readable digital code applied to embodiments of the present invention includes QR code, by which the present invention may be non-limited. For instance, any optically readable digital code capable of containing information is applicable to the present invention irrespective of types of the codes. In the following embodiments of the present invention, assume that information for creating/reading QR code containing random information is provided to a mobile terminal in advance. In this case, since sources for a method of creating or reading QR code are already known to the public, details of the creating/reading method shall be omitted from the following description.

An operation of a mobile terminal for the side information insertion is described with reference to FIG. 3 as follows.

FIG. 3 is a flowchart of a process for inserting an optically readable digital code in a multimedia content in a mobile terminal according to one embodiment of the present invention.

Referring to FIG. 3, it may be able to select a multimedia content to insert a code therein. In particular, the multimedia content, in which a code will be inserted, may include a video or a still image (e.g., a photo). This multimedia content may be selected via a camera application for obtaining an image by activating the camera 121, a reading (play) application, a file browser application or the like [S310].

Once the content (hereinafter named 'image' for clarity) is selected, it may be able to activate a side information input mode in response to a prescribed command input [S320]. For instance, while the camera application is active, the side information input mode can be entered in accordance with a selection of a prescribed menu before a user takes a photo and then saves the taken image. Alternatively, after the user has selected an image previously saved in the memory via a file browser, the side information input mode can be entered.

Once the side information input mode is active, the user may be able to write side information, which is to be inserted in the corresponding image, by performing an input via the user input unit 130 [S330].

In this case, the input via the user input unit 130 may include a text information input via hardware key buttons or a virtual keypad displayed on the touchscreen.

Once the side information is completely written, it may be able to determine whether to transmit (or upload) the complete side information and the image externally [S340]. In this case, whether to perform the upload may be determined in accordance with a user's command input via the user input unit 130 or a previously-saved setting.

If it is determined not to perform the upload, the controller 180 may be able to directly convert the written side information to QR code [S360a]. If it is determined to perform the upload, the controller 180 uploads the side information and/or the image externally [S350] and may be then able to convert the upload information to QR code [S360].

For clarity, a location of a target of the upload is described as a webpage in this specification, by which the present invention may be non-limited. For instance, the target of the upload may include one of a general webpage, a web server, an SNS server, a cloud server for providing cloud computing based functions, a prescribed terminal and the like, each of which is accessible via the wireless communication unit 110.

The upload information may conceptionally include at least one of URL information of an upload target location, information for identifying a server or a prescribed terminal, and side information inputted via a user input unit. Of course, it is able to upload an image to a web without performing the side information writing step (i.e., the upload is determined after selection of an image in which QR code will be inserted). Of course, it may be able to write side information in the course of uploading an image to a web.

Once the QR code is created, it may be able to determine whether the created code will be saved in a prescribed size and/or at a prescribed position on the image [S370].

For example of the prescribed position, the created QR code may be arranged at a preset position in a photo or video (e.g., one side or center of a content image) or a position designated via the user input unit 130.

Moreover, the prescribed size means a relative size on the image instead of the number of cells in accordance with a side information size shown in Table 3. So to speak, a size of cell configuring a code is determined by a size of side information in the step S360/S360a. Yet, in the present step, how many pixels are occupied within an image by one cell is determined.

The step S370 shall be described in detail with reference to FIG. 4C later.

Subsequently, it may be able to determine a storage form [S380].

For example of the storage form, the QR code may be saved in a manner of configuring a portion of image information of a corresponding image or may be saved as a file separate from a corresponding image. In case that the QR code is separately saved, when the corresponding image is displayed, the QR code may be saved in a manner of being overlaid at a specific position on the corresponding image. In particular, in the former case, the QR code configures a position of an image or video to create a single multimedia file eventually. In the latter case, the QR code is saved as a separate image file to create two multimedia files (e.g., a QR code file and a multimedia content file) eventually. In the former case, although information loss may be generated from an original image as much as a size occupied in a corresponding content by the QR code, since there is a single file only, the former case provides good mobility and keeping. In the latter case, since two files are created despite that the original image has no loss, user's caution may be required for management. Of course, in the latter case, if a user directly designates information on a position (e.g., coordinates) of the QR code displayed in a multimedia content or information on a display view/interval (in case of a video), a file for saving this information may be further created.

Once such factors as the storage form of the QR code, the position of the QR code, the size of the QR code and the like are finally determined, the QR code inserted multimedia content or the file containing the QR code information may be saved in the memory 160 in accordance with the determined factors [S390].

In the following description, a method of inserting side information using the above-mentioned QR code is explained in detail with reference to FIGS. 4A to 7.

FIG. 4A is a diagram for one example of a process for inserting side information in a photo taken via a mobile terminal according to one embodiment of the present invention.

Referring to FIG. 4A (a), as a camera photographing mode is active, a preview image can be displayed on the touchscreen 151. In doing so, if a user touches a shutter icon 410, an image of a subject can be photographed via the camera 121.

As the photographing is completed, referring to FIG. 4A (b), a popup window may be displayed. In this case, the popup window may include an input menu 421 for inputting side information, i.e., for entering a side information input mode, a share menu for transmitting a photographed image externally, a save menu 425 for directly saving the photographed image as an image file in the memory 160, and a cancel menu 427 for ending a re-photographing/photographing mode.

In doing so, if the user selects the input menu 421, a user interface (not shown in the drawing) for receiving an input of side information from the user may be displayed. To this end, the user interface may include a virtual keypad for a text input in a general touchscreen based smart phone or tablet and a window configured to display a content inputted via the virtual keypad. Of course, if a hardware keypad is provided, a text inputted via the hardware keypad may be displayed on the window.

Once the input of the side information is completed, referring to FIG. 4A (c), the inputted side information (e.g., a text 430) is displayed on the popup window. And, a save menu 431 for creating QR code by converting the inputted side information and a cancel menu 433 for cancelling the side information input may be displayed on the popup window.

If the save menu 431 is selected, referring to FIG. 4A (d), the controller 180 creates the QR code including the inputted side information and is then able to control a photographed image 440 to be displayed in a manner of being overlaid together with the created QR code 450. Of course, as mentioned in the foregoing description, the QR code may be saved as a separate file or a single image file in a manner of overwriting a partial image information of the photographed image, i.e., together with the photographed image by replacing a portion of the photographed image in accordance with settings. And, a cell size of the QR code may be automatically determined in accordance with a size of the inputted side information, as mentioned in the foregoing description with reference to Table 3. Moreover, in the situation shown in FIG. 4A (d), a position or size of the QR code may be changeable. This is described in detail with reference to FIG. 4C later.

Yet, it may be difficult for the user to determine an actual size of the QR code in accordance with a size of the side information. Hence, a preview function may be provided. This is described with reference to FIG. 4B as follows.

Figure 4B:
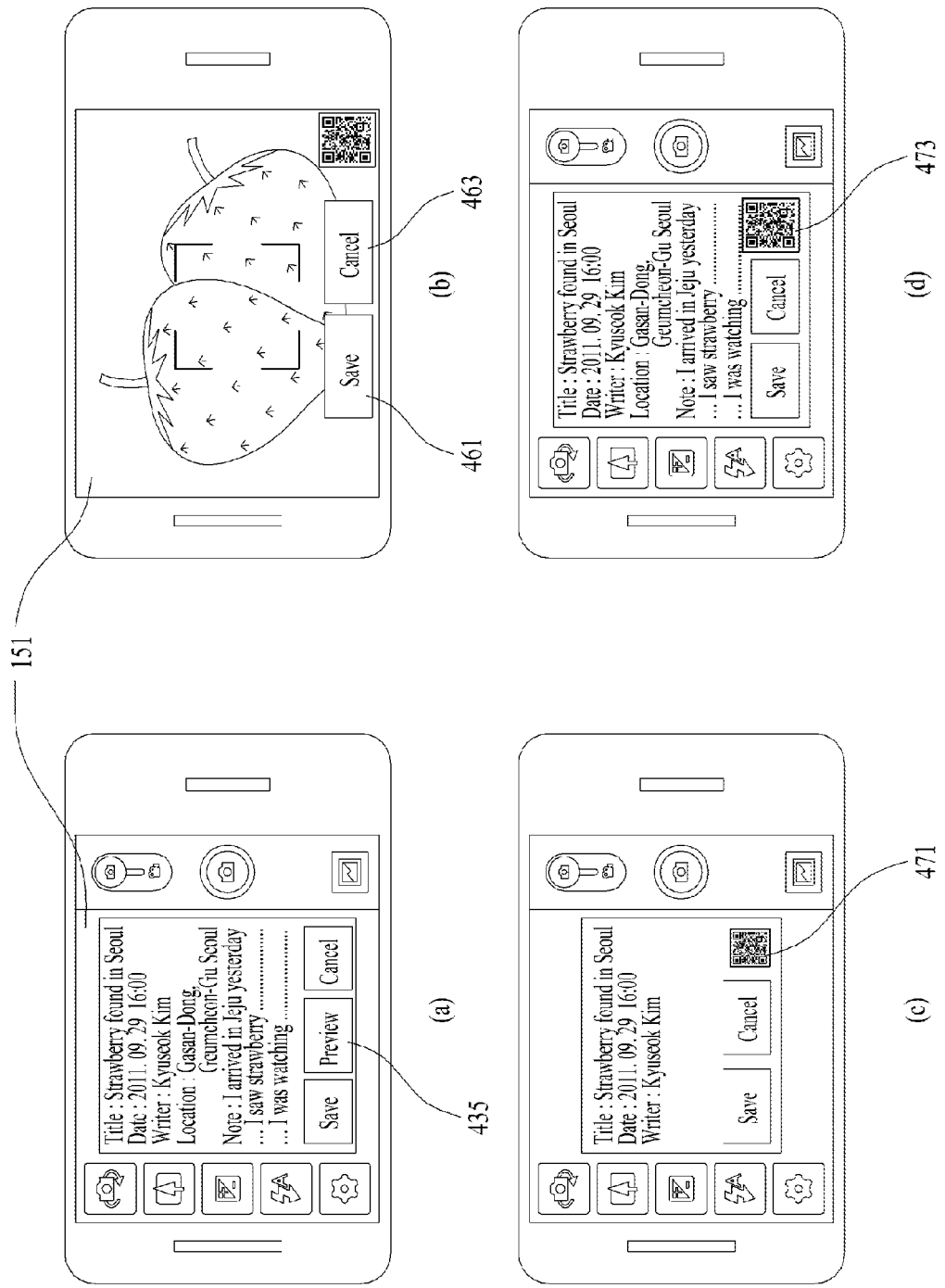
FIG. 4B is a diagram for one example of a preview function executable in inserting side information in a photo taken via a mobile terminal according to one embodiment of the present invention.

FIG. 4B is a diagram for one example of a preview function executable in inserting side information in a photo taken via a mobile terminal according to one embodiment of the present invention.

Referring to FIG. 4B, the preview function may be activated in the course of entering the state shown in FIG. 4A (d) from the state shown in FIG. 4A (c) [e.g., if the save menu 431 is selected in FIG. 4A (c) or a preview menu 435 is selected from the popup window shown in FIG. 4B (a)].

Once the preview function is active, the controller 180 creates QR code corresponding to the finally inputted side information and may then control a size of the QR code to be previewed by the user in a manner that the created QR code is overlaid on the photographed image shown in FIG. 4B (b). When the preview function is active, a save menu 461 and a cancel menu 463 may be displayed. If the save menu 461 is selected, the state shown in FIG. 4A (d) may be entered. On the contrary, if the cancel menu 463 is selected, the user interface for inputting/modifying a side information may be displayed again.

For another example of the preview function, a size of the QR code corresponding to the side information inputted up to now may be displayed on the user interface for inputting side information or a prescribed region of the popup window [FIG. 4B (c), FIG. 4B (d)]. Comparing FIG. 4B (c) to FIG. 4B (d), a size of the displayed QR code may increase in proportion to a size of the side information [e.g., size 471<size 473].

In the following description, how to change a size/position of the QR code is described with reference to FIG. 4C.

Figure 4C:
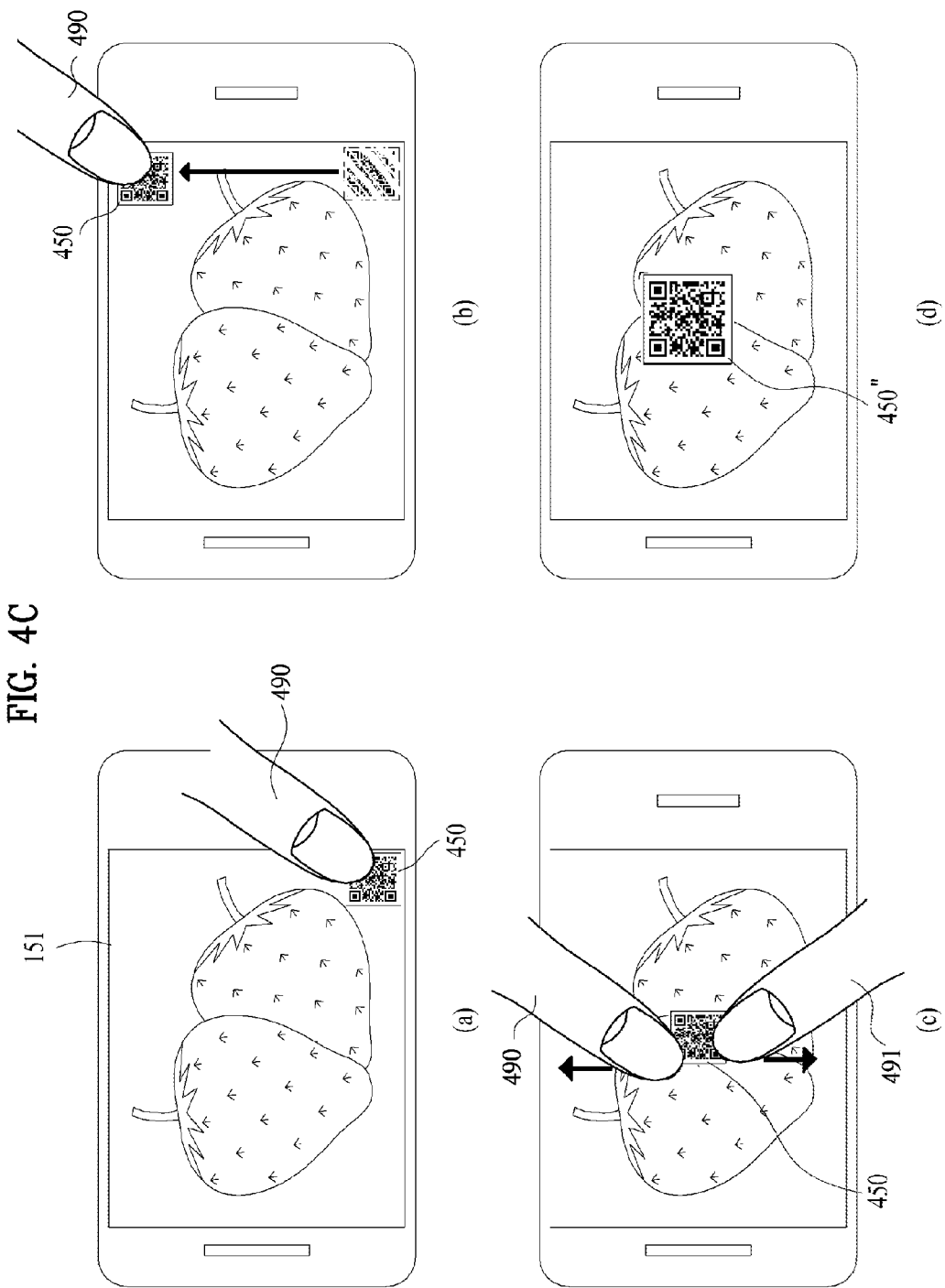
FIG. 4C is a diagram for one example of a process for changing a size/position of QR code in inserting side information in a photo taken via a mobile terminal according to one embodiment of the present invention.

FIG. 4C is a diagram for one example of a process for changing a size/position of QR code in inserting side information in a photo taken via a mobile terminal according to one embodiment of the present invention.

Referring to FIG. 4C, in case that the QR code is created by the step S360 or the step S360a (the preview function executed case included), the QR code 450 may be displayed at a default position (e.g., a right bottom end) [FIG. 4C (a)].

In particular, the default position may be determined in advance or may be determined by the controller 180 in accordance with a predetermined condition. For example, the predetermined condition may include one of a face recognition, a numeral/text, a focus point recognition and the like. In case of the face recognition, the controller 180 performs the face recognition on the taken image. If a part recognized as a human face exists at the default position, the controller 180 may be able to determine an initial position of the QR code by avoiding the corresponding position. Similarly, a position at which the numeral/text is detected by optical character recognition algorithm may be excluded from the initial position of the QR code. Moreover, in case that a focal point is implemented to match a prescribed point selected from a preview image in photo taking mode, a point selected from a focus may be excluded from the initial position of the QR code. Since the focused point is intended to provide a clearest view of a photo taken by a user, it is not preferable that the focused point is blocked by the QR code.

When the QR code is displayed at the initial position determined by one of the above-mentioned methods, if a user's touch-drag input to the QR code via a pointer 490 is detected from the touchscreen, the QR code arranged position on the image may be changed as shown in FIG. 4C (b).

Meanwhile, a size of the QR code may be changed by a pinch-in/out action (e.g., while two different points are simultaneously touched, a touch input pattern of decreasing/increasing a distance between the two touched points). For instance, if a distance between the touched points with two pointers 490 and 491 increases [FIG. 4C (c)], a size 450" of the QR code can be increased.

After the position or size of the QR code has been changed, if a region except the QR code located region in the taken image is touched, the controller 180 determines that the user has finished the position/size change of the QR code and may be then able to save the taken image in the memory by reflecting the finally changed position/size of the QR code.

In the following description, a case of sharing the taken image is explained in detail with reference to FIG. 5.

FIG. 5 is a diagram for a process for inserting share information in case that a photo taken via a mobile terminal according to one embodiment of the present invention is shared externally.

Referring to FIG. 5(a), if the share menu 423 is selected in the situation shown in FIG. 4A (b), a popup window 510 including a list of upload means is displayed on the touchscreen.

Referring to FIG. 5(b), after a user has selected one of the upload means from the popup window, if the user selects an upload menu 520 after writing a text for the taken image, both of the taken image and the text may be uploaded in the manner previously determined by the selected upload means. In this case, the upload means may include SNS, MMS, short-range wireless communication, email, messenger, cloud and the like.

Once the upload has been completed, the controller 180 acquires upload information via the upload means and then converts the acquired upload information to QR code. Since the remaining process subsequent to the QR code conversion is similar to that shown in FIG. 4A (d), its details shall be omitted for clarity.

The upload information may conceptionally include URL information according to the upload means, information for identifying a server or other terminals, a side information inputted via the user input unit for upload, and the like.

In particular, the upload information may include a newly granted URL in case that a unique URL is granted to such a post, which is created by being newly uploaded via an upload means, as Twitter, Blog and the like. And, the upload information may include a representative URL of a website that provides a corresponding upload service. In case that the upload means includes MMS/messenger or short range communication, the upload information may include MMS/messenger recipient information (e.g., phone number, name on phonebook, ID, etc.) or short range communication connection information (e.g., device ID number: MAC address, etc.).

Meanwhile, the case of selecting whether to receive an input of side information from a user via the popup window displayed after photographing above all or perform the upload is described with reference to FIG. 4A. Yet, it may be able to select whether to convert an inputted side information to QR code directly or whether to upload the inputted side information together with the taken image. This is described with reference to FIG. 6 as follows.

FIG. 6 is a diagram for another example of a process for inserting side information in a photo taken via a mobile terminal according to one embodiment of the present invention.

Referring to FIG. 6, if an image is taken, a popup window may be displayed [FIG. 6(a)]. In this case, the popup window may include an input menu 611 for directly inputting side information, a save menu 613 for saving the taken image as an image file in the memory 160 and a cancel menu 615 for re-photographing.

If a user selects the input menu 611, as mentioned in the foregoing description with reference to FIG. 4, a user interface (not shown in the drawing) for receiving an input of side information from the user may be displayed.

Once the input of the side information is completed, referring to FIG. 6(b), the inputted side information (e.g., text) is displayed. And, a save menu 621 for creating QR code by converting the inputted side information, a share menu 623 for uploading both of the taken image and the inputted side information via an upload manes and a cancel menu 625 for cancelling the wide information writing can be displayed.

If the save menu 621 is selected, the step shown in FIG. 4A (d) is entered. If the share menu 623 is selected, an upload means selecting step similar to the former step shown in FIG. 5(a) may be entered. Of course, if the share menu 623 is selected, since the text for the taken image has been already written, the step shown in FIG. 5(b) may be omitted.

According to the embodiments described with reference to FIGS. 4A to 6, the side information is inserted as QR code in case of taking a still image via a camera. In the following description, a process for inserting side information using QR code in case of taking a video is explained with reference to FIG. 7.

Figure 7:
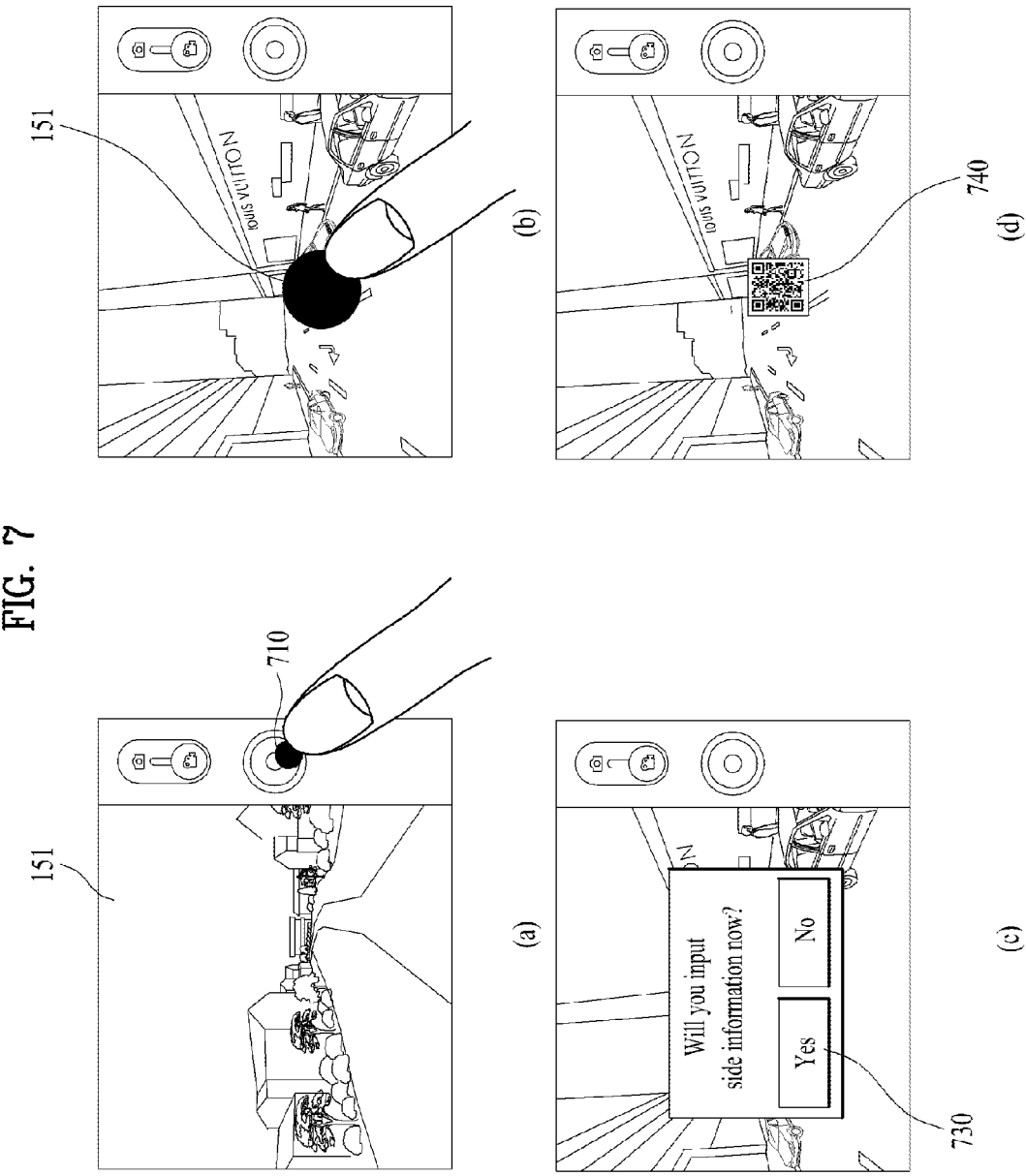
FIG. 7 is a diagram for one example of a process for inserting side information in taking a video via a mobile terminal according to one embodiment of the present invention.

FIG. 7 is a diagram for one example of a process for inserting side information in taking a video via a mobile terminal according to one embodiment of the present invention.

Referring to FIG. 7(a), if a video taking mode is entered, a preview image may be displayed on the touchscreen 151. In doing so, if a user touches a recording icon 710, a video taking via the camera 121 may start.

In the course of taking the video, if the user intends to insert side information at a specific position, referring to FIG. 7(b), the user may be able to apply a touch input of a prescribed pattern to a desired position 720 in the preview image. Hence, referring to FIG. 7(c), a popup window 730 for enabling the user to confirm whether to input the side information may be displayed. If the user selects 'input now', a user interface (not shown in the drawing) for receiving an input of side information from the user may be displayed while the video taking continues. Once the video taking is completed, the controller 180 may be able to insert QR code including the inputted side information into the selected position. Of course, as mentioned in the foregoing description, 'QR code insertion' may mean that the QR code is inserted to configure one portion of image information of the video. Alternatively, after the QR code has been created as a separate file, 'QR code insertion' may mean that the QR code is inserted into the corresponding position in the corresponding view in a manner of being overlaid on the corresponding video that is being played.

If the user selects 'input later' in FIG. 7(c), the user interface for receiving the input of the side information may be displayed after completion of the video taking. In this case, it is advantageous in that the user may be able to concentrate on the video taking.

Meanwhile, the creation and saving of the code in the course of the photographing via the camera are described with reference to FIGS. 4A to 7 for example, by which the present invention may be non-limited. For instance, according to the present invention, a code can be created and saved in a manner of selecting one of multimedia files saved in the memory by a previous photographing, a download and the like. For instance, QR code may be inserted into a previously saved file in a manner of selecting a specific image/video file by a prescribed menu manipulation performed on a file browser application for managing multimedia files, receiving an input of side information, and then inserting the QR code.

In the following description, methods of appreciating and utilizing a multimedia content containing QR code inserted by one of the aforementioned methods are explained in detail with reference to FIGS. 8 to 13.

Figure 8:
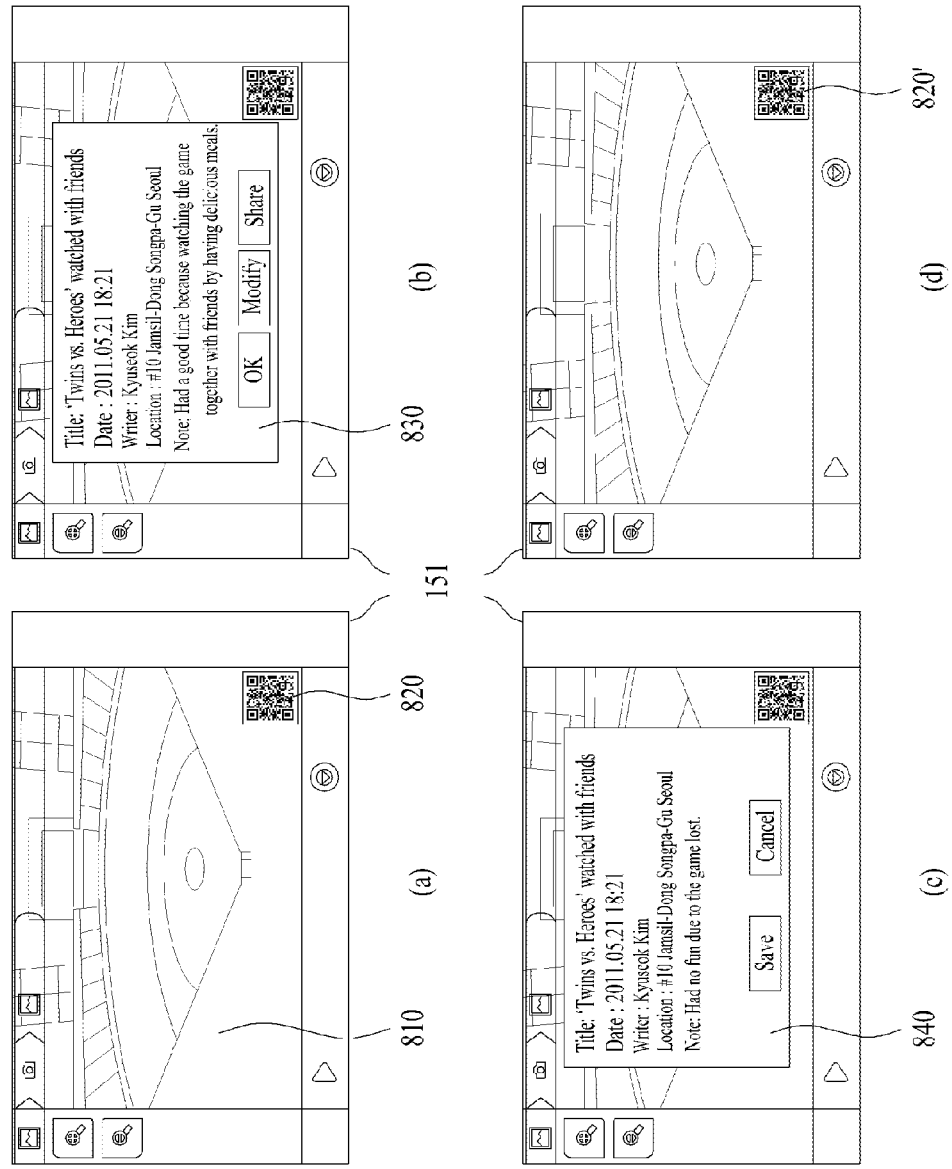
FIG. 8 is a diagram for one example of a process for checking and modifying side information via a QR code inserted photo in a mobile terminal according to one embodiment of the present invention.

FIG. 8 is a diagram for one example of a process for checking and modifying side information via a QR code inserted photo in a mobile terminal according to one embodiment of the present invention.

In the description of the following embodiments shown in the following drawings including FIG. 8, assume that a QR code recognition function is built in a multimedia file play application provided to the mobile terminal. In order to implement this, when a QR code is inserted in a multimedia file, it may be able to set up a bit for inserting a specific text string into a file name or a bit for inserting the QR code into a header of the multimedia file. Moreover, the multimedia file play application may be enabled to detect a presence or non-presence of the QR code by searching multimedia files. When QR code is saved as a separate file instead of being inserted in a multimedia file, it may be able to determine whether a QR code file corresponds to a specific multimedia file with reference to file name similarity or arrangement information containing position/size information for arranging the QR code in the corresponding multimedia file.

Referring to FIG. 8(*a*), while a photo view application is active, when a specific image 810 having a QR code inserted therein is displayed, a user is able to touch a QR code part 820 situated at a right side.

Referring to FIG. 8(*b*), if the QR code part 820 is touched, the controller 180 interprets the QR code at the touched point and may be then able to display information included in the QR code as a popup window 830. In doing so, if the user intends to modify side information contained in the QR code, the user may be able to select a modify menu included in the popup window 830. If the modify menu is selected, a user interface (not shown in the drawing) for modifying the side information may be displayed. In this case, the user interface may have any forms only if including general text editing functions (e.g., an original text display function, an original text delete function, an original text add function, such as an input means as a virtual keypad for delete and add, etc.).

Referring to FIG. 8(*c*), after the side information has been modified, if a save menu is selected from the popup window 840, the controller 180 newly creates a QR code in accordance with the modified side information and is then able to insert the newly created QR code into the position at which the former (original) QR code has been arranged. In doing so, if a size of the side information changes in accordance with the modification, a size of the newly created QR code may be changed in accordance with Table 3.

If a share menu is selected in FIG. 8(*b*), as mentioned in the foregoing description with reference to FIG. 5(*a*), a screen for selecting an upload means may be displayed. Once an upload is completed via the selected upload means, the QR code of the corresponding image may be changed to correspond to the upload information mentioned in the foregoing description.

Figure 9:
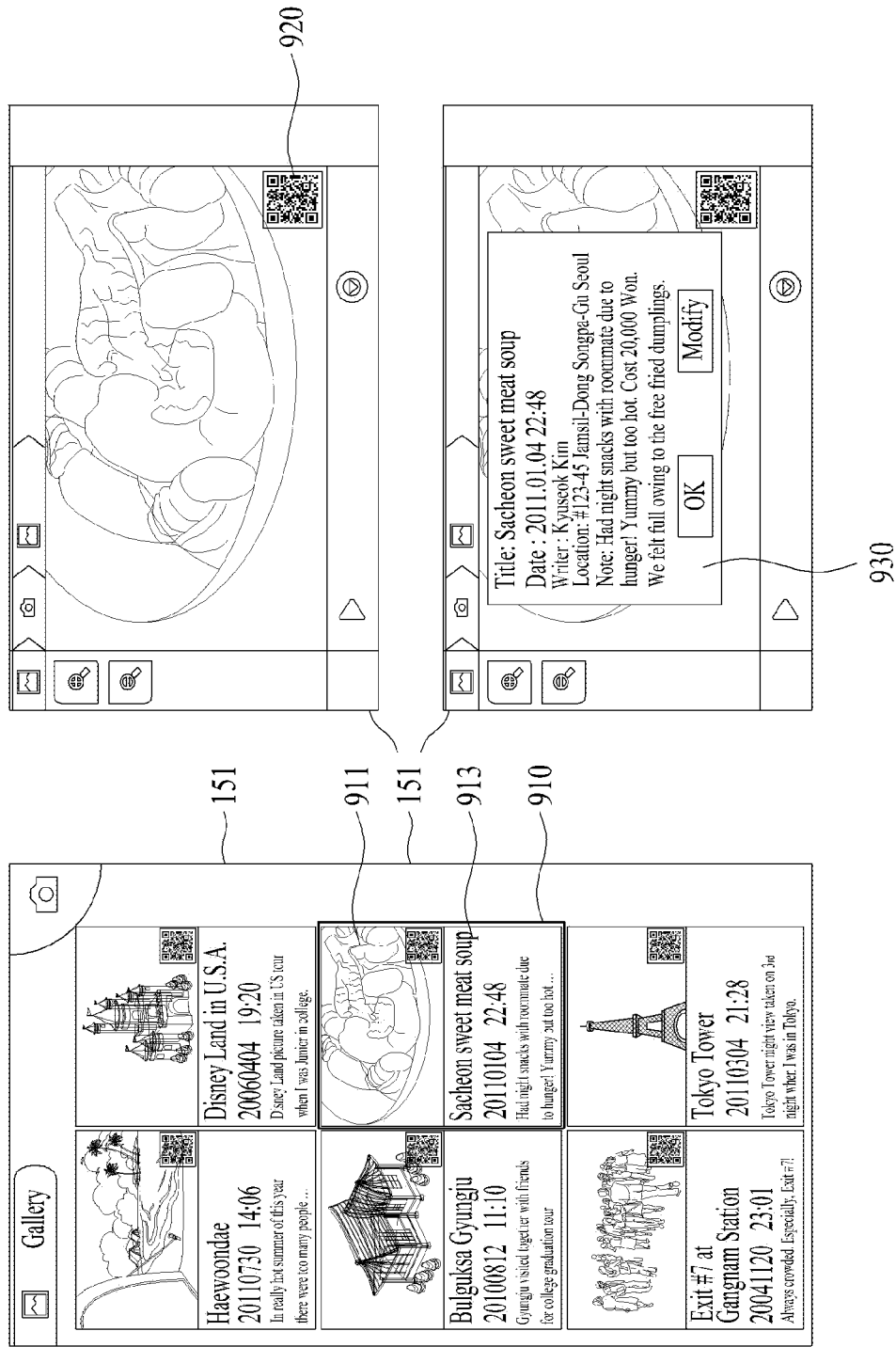
FIG. 9 is a diagram for one example of a process for checking side information when a plurality of QR code inserted photos are displayed in a mobile terminal according to one embodiment of the present invention.

FIG. 8 shows the case that a single image is displayed on a single screen. FIG. 9 shows a case that a plurality of images are displayed on a single screen.

FIG. 9 is a diagram for one example of a process for checking side information when a plurality of QR code inserted photos are displayed in a mobile terminal according to one embodiment of the present invention.

Referring to FIG. 9(*a*), informations on a plurality of photos in a photo view application are displayed on a single screen. In particular, a region 910, on which information on a single image file is displayed, may include a thumbnail image region 911 and a region 913 for displaying a content of a QR code inserted in the corresponding file. Of course, if there is an image file in which QR code is not inserted, the region for displaying a content of the QR code may be omitted or file information (e.g., image capacity, resolution, color information, etc.) may be displayed on the corresponding region instead.

In doing so, if a thumbnail image region corresponding to a specific file is selected, referring to FIG. 9(*b*), the corresponding file may be displayed as a full screen. If a QR code 920 is touched in the image file displayed as the full screen or the region for displaying the content of the inserted QR code is selected in FIG. 9(*a*), referring to FIG. 9(*c*), a whole content of the QR code may be displayed as a popup window 930. In the situation shown in FIG. 9(*c*), it may be able to modify the aforementioned side information contained in the QR code. Of course, as mentioned in the foregoing description with reference to FIG. 8(*b*), the popup window 930 may further include a share menu.

Figure 10:
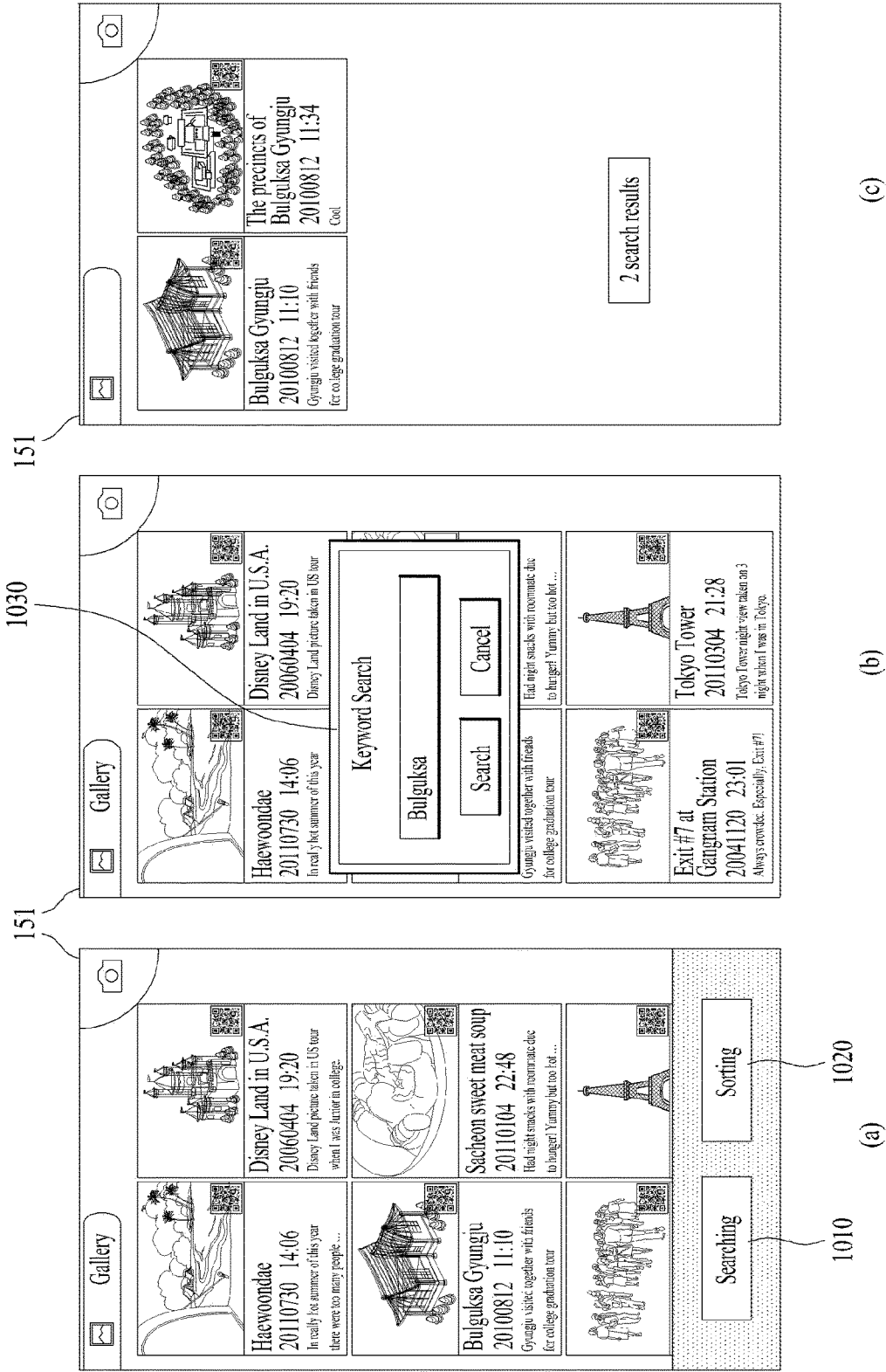
FIG. 10 is a diagram for one example of a process for performing an image search using information on QR code in a mobile terminal according to one embodiment of the present invention.
Figure 11:
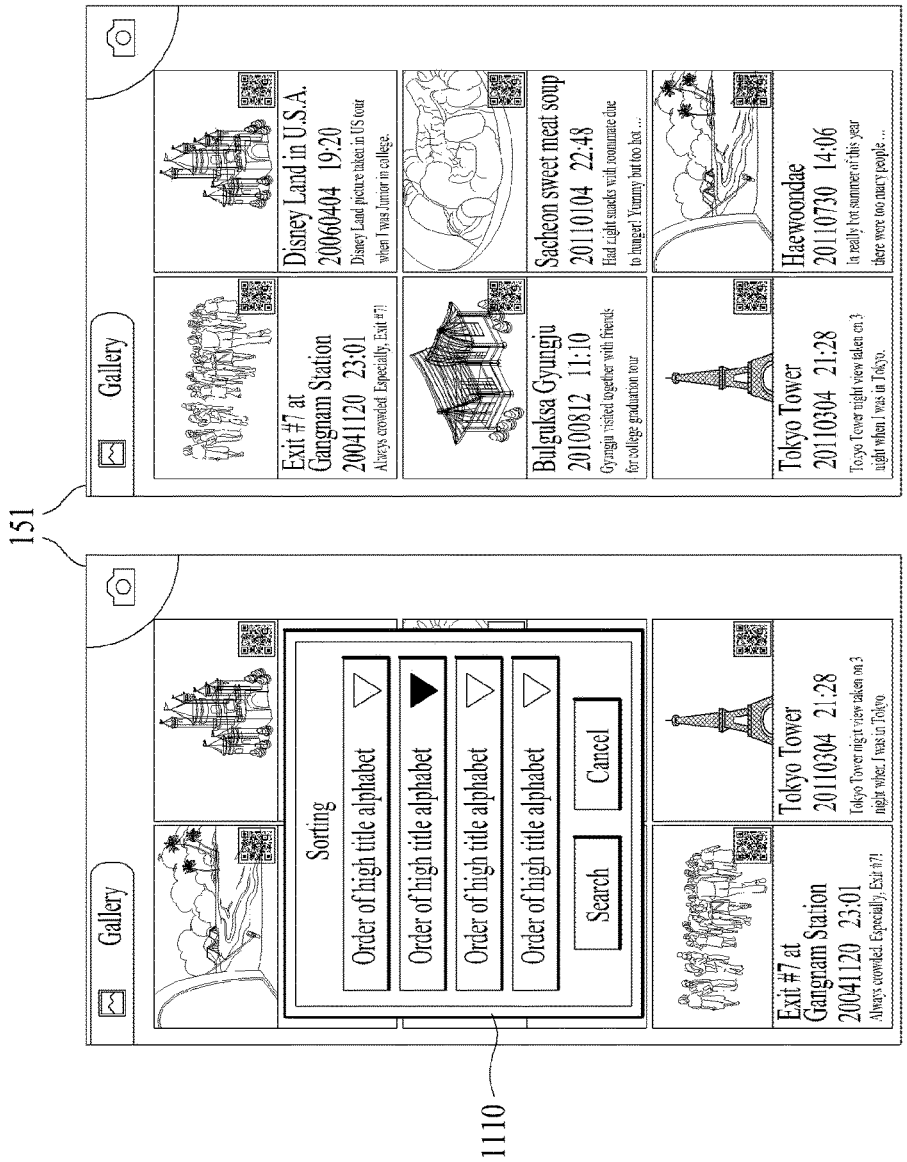
FIG. 11 is a diagram for one example of a process for performing an image sorting using information on QR code in a mobile terminal according to one embodiment of the present invention.

Meanwhile, the photo view application shown in FIG. 9(*a*) may be able to provide a search function and a sort function in accordance with the information contained in the QR code. This is described with reference to FIG. 10 and FIG. 11. In FIG. 10 and FIG. 11, assume that the photo view application is similar to that shown in FIG. 9.

FIG. 10 is a diagram for one example of a process for performing an image search using information on QR code in a mobile terminal according to one embodiment of the present invention.

Referring to FIG. 10(*a*), a search menu 1010 and a sort menu 1020 may be displayed on a bottom end of a photo view application in accordance with a prescribed menu manipulation via the touchscreen or the key button. If the search menu 1010 is selected, referring to FIG. 10(*b*), a popup window 1030 for receiving an input of a search word may be displayed. If the search word is inputted to the popup window 1030, referring to FIG. 10(*c*), images, each of which has the inputted search word contained in the QR code information, may be displayed only.

FIG. 11 is a diagram for one example of a process for performing an image sorting using information on QR code in a mobile terminal according to one embodiment of the present invention.

Referring to FIG. 11, if the sort menu 1020 is selected in FIG. 10(*a*), a popup window 1110 for receiving a selection of a sorting reference may be displayed [FIG. 11(*a*)]. If a date is inputted to the QR code inserted in each of the images and 'sorting by dates' is selected from the popup window 1110, the sorting order of the images may be changed in order of the date contained in the QR code [FIG. 11(*b*)].

In the following description, a case of playing a QR code inserted video is explained with reference to FIG. 12.

Figure 12:
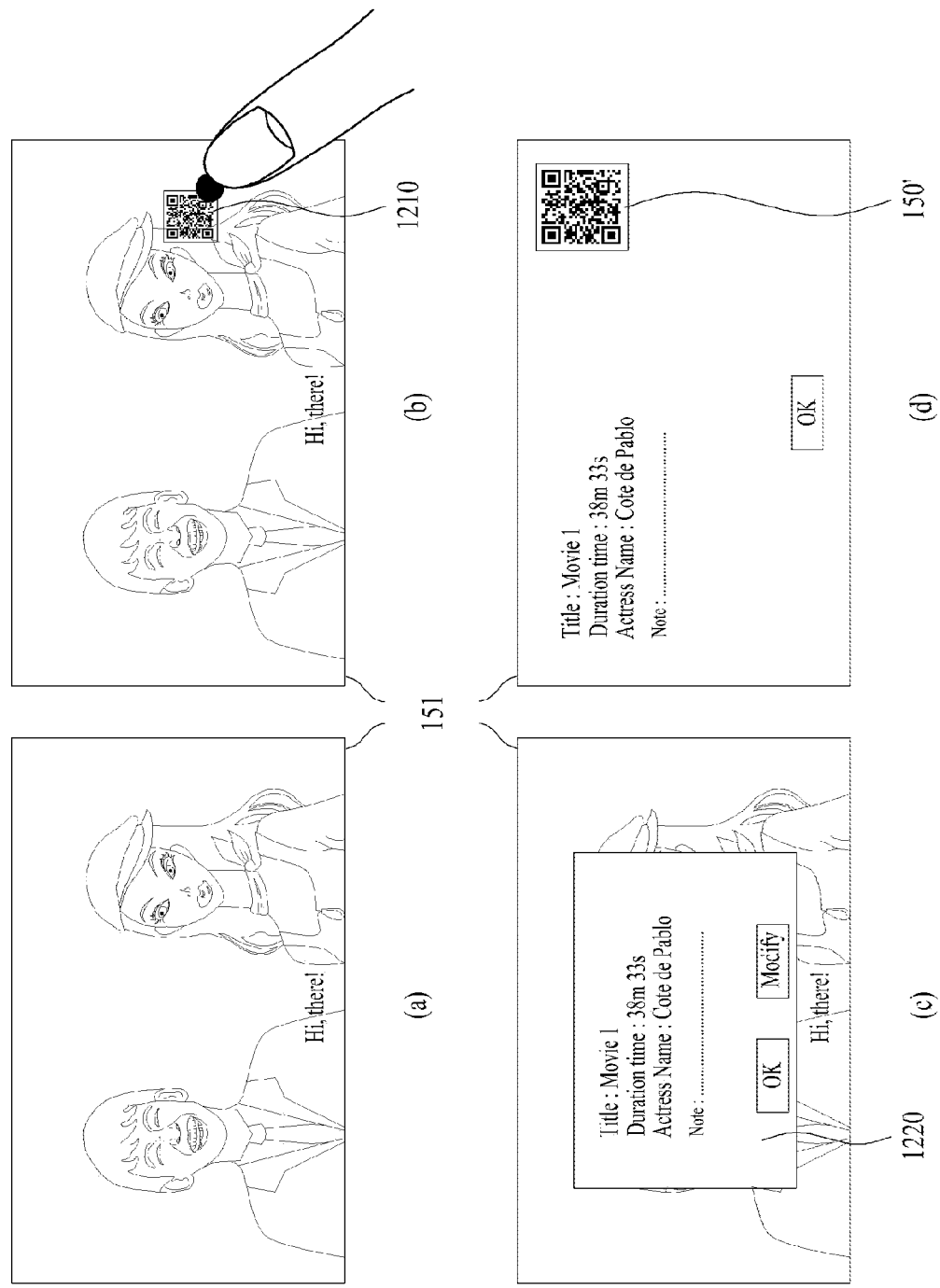
FIG. 12 is a diagram for one example of a process for checking and modifying side information in the course of playing a QR code inserted video in a mobile terminal according to one embodiment of the present invention.

FIG. 12 is a diagram for one example of a process for checking and modifying side information in the course of playing a QR code inserted video in a mobile terminal according to one embodiment of the present invention.

Referring to FIG. 12, while a video is played via a video play application [FIG. 12(*a*)], a QR code 1210 inserted in a specific view may be displayed [FIG. 12(*b*)]. In doing so, if a region for displaying the QR code 1210 is touched via the touchscreen, a text contained in the QR code may be displayed on a popup window 1220 [FIG. 12(*c*)]. In doing so, the currently played video may pause until an OK menu is selected or may continue to be displayed irrespective of the display of the popup window 1220. Of course, if a modify menu is selected from the popup window 1220, a user interface for modifying a text contained in a QR code may be displayed. And, the aforementioned share menu (not shown in the drawing) may be additionally displayed on the popup window 1220.

Of course, it may be able to check a content of a QR code, which is displayed on playing a multimedia file via a prescribed application, in a manner that a QR code readable external device scans the touchscreen [FIG. 12(*d*)]. When a QR code inserted multimedia file is played according to one embodiment of the present invention, FIG. 12(*d*) shows one example of a video displayed as a result of scanning the QR code displayed in the play image.

Meanwhile, the QR code inserted image may be utilized for a phonebook application as well. This is described with reference to FIG. 13 as follows.

Figure 13:
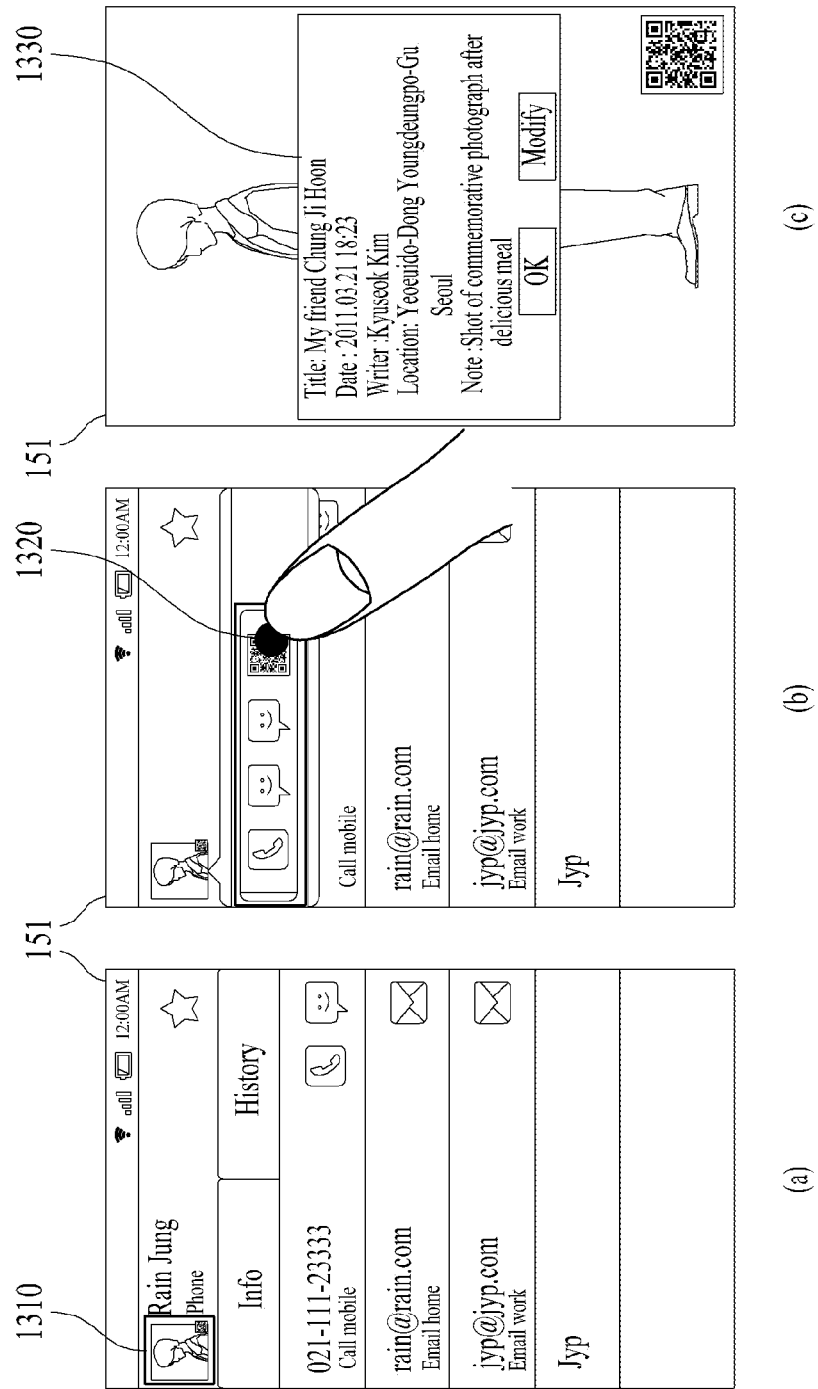
FIG. 13 is a diagram for one example of a process for checking and modifying side information in the course of playing a QR code inserted video in a mobile terminal according to one embodiment of the present invention.

FIG. 13 is a diagram for one example of a process for checking and modifying side information in the course of playing a QR code inserted video in a mobile terminal according to one embodiment of the present invention.

Referring to FIG. 13(a), an information on a specific contact item is displayed via a phonebook application. In doing so, an image 1310 set for the contact is displayed on a left top end. If the image 1310 is selected via a touch input, referring to FIG. 13(b), a popup window containing functions executable on the corresponding contact is displayed. If QR code is inserted in the selected image, a QR code item 1320 may be additionally displayed on the popup window.

If the QR code item 1320 is selected, referring to FIG. 13(c), a popup window 1330 containing a text corresponding to the QR code may be displayed as soon as the corresponding image is displayed as a full screen. It may be able to page a user interface for modifying the text corresponding to the QR code via a modify menu provided to the popup window. And, it is a matter of course that the aforementioned share menu (not shown in the drawing) may be additionally displayed on the popup window.

Besides the embodiments mentioned in the foregoing description, song information (e.g., lyrics, singer information, release date information, etc.) may be inserted as a QR code into an album jacket image displayed via a music file play application.

For another example, an icon corresponding to each memo item of a memo pad application may be replaced by a QR code that matches the corresponding memo. Moreover, an icon corresponding to each schedule in a calendar of a schedule management application may be replaced by a QR code containing the corresponding schedule information.

According to another example of one embodiment of the present invention, in utilizing a created QR code, if the QR code is separable from an original multimedia file without loss (i.e., if the QR code is saved as a file separate from the original), the controller 180 may be able to determine whether to display the QR code in accordance with an output form of the corresponding original multimedia file.

In this case, the output form may mean whether a content accompanied by a QR code is displayed on a display of a mobile terminal or whether a corresponding multimedia file is outputted via a different device. For example, the different device may include at least one of a TV, a monitor, a computer, a mobile terminal, a printer and the like, which is connectible by such a wireless sharing protocol as DLNA (digital living network alliance), UPnP (universal plug & play), BT, Wi-Fi and the like or such a wired interface as USB, S-Video, HDMI and the like.

One example of a process for determining whether to display QR code in accordance with an output form of a file is described with reference to FIG. 14 as follows.

FIG. 14 is a flowchart for another example of a process for displaying a QR code inserted content in a mobile terminal according to one embodiment of the present invention.

Referring to FIG. 14, the controller 180 may be able to enter an output mode for outputting a multimedia file accompanied by QR code in response to a command input via the user input unit 130 or another trigger condition (e.g., a detection of a connection to an external device, an activation of a specific application, etc.) [S1410].

If the multimedia file accompanied by the QR code is outputted via the display unit 151 of the mobile terminal [S1420], the controller 180 may display or hide the QR code in accordance with internal settings of the mobile terminal.

In case that a corresponding content is outputted not via the display of the mobile terminal but by an external device, whether to display the QR code can be determined depending on whether the external device is a device for a print output or a device for a display [S1440].

In case that the external device is the device for the print output, the controller 180 may control the corresponding content to be printed in a manner of having the QR code overlaid thereon (i.e., a QR code overlaid image is provided to the external device) [S1450]. If the external device includes a display means without a print function, the controller 180 may control image information to be delivered to the external device without the QR code [S1460].

When a content is outputted via such a device for a print output as a printer, if a QR code is set to be inserted, the corresponding information may be easily digitized by scanning the QR code on a print output. And, it may be able to expect a watermark function for indicating an origin for convenience. If an external display device is connected to a mobile terminal in general, it may be frequently performed the purpose of sharing an image. Therefore, in case that a content except a QR code is displayed only, visual inconvenience may not be caused by the QR code.

According to the embodiments mentioned in the foregoing description, even if a content of a multimedia file enters an analog environment from a digital environment (e.g., a case of outputting an image file onto a paper), information contained in QR code is still facilitated to be digitized using a QR code readable digital device.

It will be apparent to those skilled in the art that various modifications and variations can be specified into other form(s) without departing from the spirit or scope of the inventions.

According to one embodiment of the present invention, the above-described methods can be implemented in a program recorded medium as processor-readable codes. The processor-readable media include all kinds of recording devices in which data readable by a processor are saved. The processor-readable media include ROM, RAM, CD-ROM, magnetic tapes, floppy discs, optical data storage devices, and the like for example and also include carrier-wave type implementations (e.g., transmission via Internet).

The aforementioned embodiments for a mobile terminal capable of inserting and interpreting a digital code in a multimedia file and controlling method thereof are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of controlling a mobile terminal, the method comprising:
   acquiring an image;
   acquiring side information related to the acquired image;
   generating an optically readable digital code corresponding to the acquired side information;
   displaying the acquired image and the digital code wherein the digital code is positioned at a first position within the acquired image;
   moving the digital code to a second position within the image according to a touch input to the digital code;
   replacing a portion of the acquired image displayed on a prescribed region corresponding to the second position of the acquired image with the digital code and overwriting image information of the prescribed region with an image of the digital code; and
   saving the acquired image having the image of the digital code in the prescribed region as a single image file.

2. The method of claim 1, wherein the side information comprises text information related to the acquired image, wherein the text information is input via a user input unit.

3. The method of claim 1, further comprising: uploading the acquired image, wherein the side information comprises upload information associated with the uploaded acquired image.

4. The method of claim 3, wherein the acquired image is uploaded to an upload service comprising a social network service (SNS), a blog service, a messaging service, an email service, a cloud-computing service, or a short range communication service.

5. The method of claim 4, wherein the upload information comprises text information input via a user input unit, a URL of a webpage associated with the uploaded acquired image, or a URL associated with the upload service.

6. The method of claim 1, wherein:
   the acquired image comprises at least a still image or a video; and
   acquiring the image comprises capturing the image via a camera or selecting the image from a plurality of images saved in a memory.

7. The method of claim 1, further comprising:
   acquiring updated side information related to the acquired image;
   generating an updated optically readable digital code corresponding to the updated side information;
   replacing the digital code of the acquired image with the updated digital code; and
   saving the acquired image having the updated digital code in the prescribed region as a single image file.

8. The method of claim 1, further comprising determining a position of the prescribed region such that the prescribed region does not include a focal point of the acquired image.

9. The method of claim 1, wherein the digital code comprises a QR (quick response) code.

10. A mobile terminal comprising:
    a display;
    a memory; and
    a controller configured to:
      acquire an image;
      acquire side information related to the acquired image;
      generating an optically readable digital code corresponding to the acquired side information;
      cause the display to display the acquired image and the digital code wherein the digital code is positioned at a first position within the acquired image;
      move the digital code to a second position within the acquired image according to a touch input to the digital code received via the display;
      replace a portion of the acquired image displayed on a prescribed region corresponding to the second position of the acquired image with the digital code and overwrite image information of the prescribed region with an image of the digital code; and
      cause the memory to save the acquired image having the image of the digital code in the prescribed region as a single image file.

11. The mobile terminal of claim 10, further comprising:
    a user input unit configured to receive a user input,
    wherein the controller is further configured to determine the prescribed region according to the user input.

12. The mobile terminal of claim 10, further comprising:
    a wireless communication unit configured to exchange data with an external device,
    wherein the controller is further configured to upload the acquired image via the wireless communication unit, and
    wherein the side information comprises upload information associated with the uploaded acquired image.

13. The mobile terminal of claim 12, wherein the acquired image is uploaded to an upload service comprising a social network service (SNS), a blog service, a messaging service, an email service, a cloud-computing service, or a short range communication service.

14. The mobile terminal of claim 13, further comprising:
    a user input unit configured to receive a user input,
    wherein the upload information comprises text information input via the user input unit, a URL of a webpage associated with the uploaded acquired image, or a URL associated with the upload service.

15. The mobile terminal of claim 13, wherein the upload information comprises information identifying a counterpart of a communication via the email service, the messaging service, or the short range communication service.

16. The mobile terminal of claim 10, further comprising:
    a user input unit configured to receive a user input,
    wherein the side information comprises text related to the acquired image and the text is inputted via the user input unit.

17. The mobile terminal of claim 10, further comprising a camera configured to capture images;
    wherein the acquired image comprises at least a still image or a video captured via the camera;
    wherein the controller is further configured to acquire the image by causing the camera to capture the image or by selecting the image from a plurality of images saved in a memory.

18. The mobile terminal of claim 10, wherein the digital code comprises a QR (quick response) code.

19. The mobile terminal of claim 10, wherein the controller is further configured to determine a position of the prescribed region such that the prescribed region does not include a focal point of the acquired image.

20. The mobile terminal of claim 10, wherein the controller is further configured to:
    acquire updated side information related to the acquired image;
    generate an updated optically readable digital code corresponding to the updated side information;
    replace the digital code of the acquired image with the updated digital code; and cause the memory to save the acquired image having the updated digital code in the prescribed region as a single image file.

* * * * *